1652B2

United States Patent

Gaal et al.

(10) Patent No.: US 8,891,652 B2
(45) Date of Patent: Nov. 18, 2014

(54) STRUCTURED MIMO CODEBOOK

(75) Inventors: Peter Gaal, San Diego, CA (US); Stefan Geirhofer, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/167,209

(22) Filed: Jun. 23, 2011

(65) Prior Publication Data

US 2012/0027113 A1    Feb. 2, 2012

Related U.S. Application Data

(60) Provisional application No. 61/358,368, filed on Jun. 24, 2010.

(51) Int. Cl.
*H04B 7/02* (2006.01)
*H04L 1/02* (2006.01)
*H04B 7/06* (2006.01)
*H04B 7/04* (2006.01)

(52) U.S. Cl.
CPC ............ *H04B 7/0615* (2013.01); *H04B 7/0469* (2013.01); *H04B 7/0626* (2013.01); *H04B 7/0658* (2013.01); *H04B 7/0465* (2013.01); *H04B 7/0478* (2013.01)
USPC ........... 375/267; 375/346; 375/347; 375/348; 375/299; 375/358; 370/342

(58) Field of Classification Search
USPC ......... 375/267, 278, 324, 260, 346, 347, 348, 375/299, 358, 268, 219
See application file for complete search history.

(56) References Cited

U.S. PATENT DOCUMENTS

| | | | |
|---|---|---|---|
| 6,594,226 B1 * | 7/2003 | Benning et al. | 370/208 |
| 8,259,835 B2 * | 9/2012 | Kim | 375/267 |
| 2009/0041140 A1 | 2/2009 | Xiao et al. | |
| 2009/0041150 A1 * | 2/2009 | Tsai et al. | 375/267 |
| 2009/0080549 A1 * | 3/2009 | Khan et al. | 375/260 |
| 2009/0109873 A1 | 4/2009 | Shen et al. | |
| 2009/0122857 A1 * | 5/2009 | Li et al. | 375/239 |
| 2010/0118817 A1 | 5/2010 | Damnjanovic et al. | |

FOREIGN PATENT DOCUMENTS

| | | |
|---|---|---|
| EP | 2037646 A2 | 3/2009 |
| JP | 2008104193 A | 5/2008 |
| JP | 2009071825 A | 4/2009 |
| JP | 2011188295 A | 9/2011 |

(Continued)

OTHER PUBLICATIONS

Partial International Search Report—PCT/US2011/041819, ISA/EPO—Oct. 6, 2011.

(Continued)

*Primary Examiner* — Qutbuddin Ghulamali
(74) *Attorney, Agent, or Firm* — Seyfarth Shaw LLP

(57) ABSTRACT

Provided is a method of wireless communication which includes selecting a codebook from a plurality of codebooks in accordance with an antenna characteristic, and transmitting an indication of the selected codebook. Each of the plurality of codebooks is associated with one of a plurality of antenna characteristics. In some designs, channel state information is received from a user equipment. The channel state information may be used to determine downlink scheduling and/or precoding. In some designs, the channel state information may include feedback elements associated with different subband granularity. The feedback elements may also indicate a selection of a subset of precoder column vectors and/or a phase offset between two groups of transmit antennas.

20 Claims, 14 Drawing Sheets

(56) References Cited

FOREIGN PATENT DOCUMENTS

| JP | 2013502111 A | 1/2013 |
|---|---|---|
| JP | 2013520122 A | 5/2013 |
| WO | 2008118067 A2 | 10/2008 |
| WO | WO 2009096708 A1 | 8/2009 |
| WO | 2009125956 A1 | 10/2009 |
| WO | 2009134357 A1 | 11/2009 |
| WO | WO 2010024543 A2 | 3/2010 |
| WO | 2011017991 A1 | 2/2011 |
| WO | 2011098975 A1 | 8/2011 |

OTHER PUBLICATIONS

CATT: "Codebook design for 8Tx DL MIMO," 3GPP TSG RAN WG1 meeting #59b, R1-100022, 3rd Generation Partnership Project (3GPP), Valencia, Spain, Jan. 18-22, 2010, 7 pages.

Ericsson, "Refinements of Feedback and Codebook Design," 3GPP TSG-RAN WG1 #61, R1-102630, Montreal, Canada, May 10-14, 2010, 11 pages.

Ericsson, St-Ericsson: "A Flexible Feedback Concept," 3GPP TSG-RAN WG1 #59bis, R1-100051, 3rd Generation Partnership Project, Valencia, Spain, Jan. 18-22, 2010, 5 pages.

Qualcomm Inc., "Codebook Design for DL LTE-A MIMO operation," 3GPP TSG-RAN WG1 #59bis, R1-101490, 3rd Generation Partnership Project, San Francisco, USA, Feb. 22-26, 2010, 7 pages.

"Qualcomm Inc., "Explicit feedback in support of MU-MIMO operation," 3GPP TSG-RAN WG1 #59bis, R1-100685, 3rd Generation Partnership Project, Valencia, Spain, Jan. 18-22, 2010, 3 pages".

Qualcomm Inc., "Extending the UE feedback for efficient MU-MIMO," 3GPP TSG-RAN WG1 #59bis, R1-101488, 3rd Generation Partnership Project, San Francisco, USA, Feb. 22-26, 2010, 9 pages.

Qualcomm Inc., "Extending the UE feedback for efficient MU-MIMO and CoMP," 3GPP TSG-RAN WG1 #59bis, R1-100684, 3rd Generation Partnership Project, Valencia, Spain, Jan. 18-22, 2010, 5 pages.

Qualcomm Inc: "Codebook Design for DL LTE-A operation", 3GPP Draft; R1-100753, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; 20100118, Jan. 21, 2010, XP050418387, [retrieved on Jan. 21, 2010].

Samsung, "8Tx Codebook Design for Channel Feedback in support of DL SU-MIMO in LTE-A," 3GPP TSG RAN WG1 Meeting #59bis, R1-100119, 3rd Generation Partnership Project, Valencia, Spain, Jan. 18-Jan. 22, 2010, 16 pages.

Samsung, "Views on the feedback framework for Rel. 10," 3GPP TSG RAN WG1 Meeting #61, R1-103377, 3rd Generation Partnership Project, Montreal, Canada, May 10-May 14, 2010, 17 pages.

ZTE, "DL Codebook Design for 8 Tx MIMO in LTE-A," 3GPP TSG RAN WG1 Meeting #59bis, R1-100531, 3rd Generation Partnership Project, Valencia, Spain, Jan. 20-26, 2010, 8 pages.

International Search Report and Written Opinion—PCT/US2011/041819—ISA/EPO—Feb. 14, 2012.

Motorola: "4-Tx Codebook Design and Performance Comparison", 3GPP TSG-RAN WG1 Meeting #58b, Oct. 12, 2009, R1-093964, pp. 28.

Panasonic: "8Tx Codebook Design," 3GPP TSG RAN WG1 Meeting #60bis, R1-102460, Beijing, China, Apr. 12-16, 2010, pp. 1-7.

Pantech: "On the two stage 8 Tx codebook," 3GPP TSG-RAN WG1 Meeting #61b, Jun. 22, 2010, R1-103616, pp. 7.

Texas Instruments: "8Tx Codebook Design," 3GPP TSG-RAN WG1 Meeting #61b, Jun. 22, 2010, R1-103701, pp. 7.

Texas Instruments: "Possible Refinement on 8Tx Codebook Design", 3GPP TSG-RAN WG1 Meeting #60b, Apr. 12, 2010, R1-102104, pp. 8.

ZTE: "Codebook Design for E-UTRA MIMO," 3GPP TSG-RAN WG1 #47bis, R1-070202, Jan. 15-19, 2007, pp. 1-6.

* cited by examiner

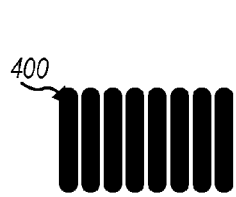
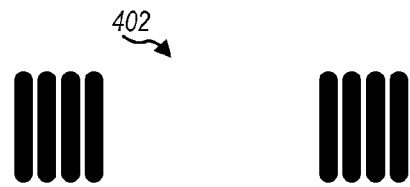
FIG. 4A
FIG. 4B
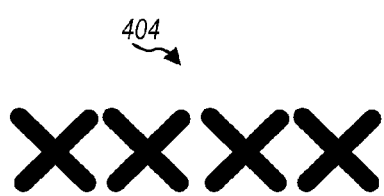
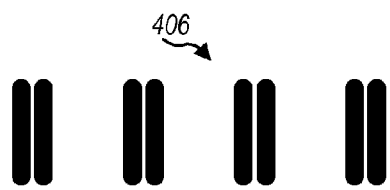
FIG. 4C
FIG. 4D
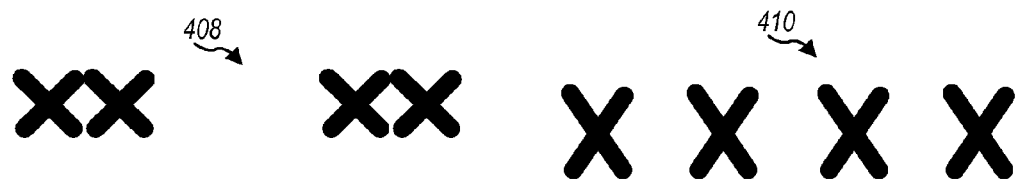
FIG. 4E
FIG. 4F

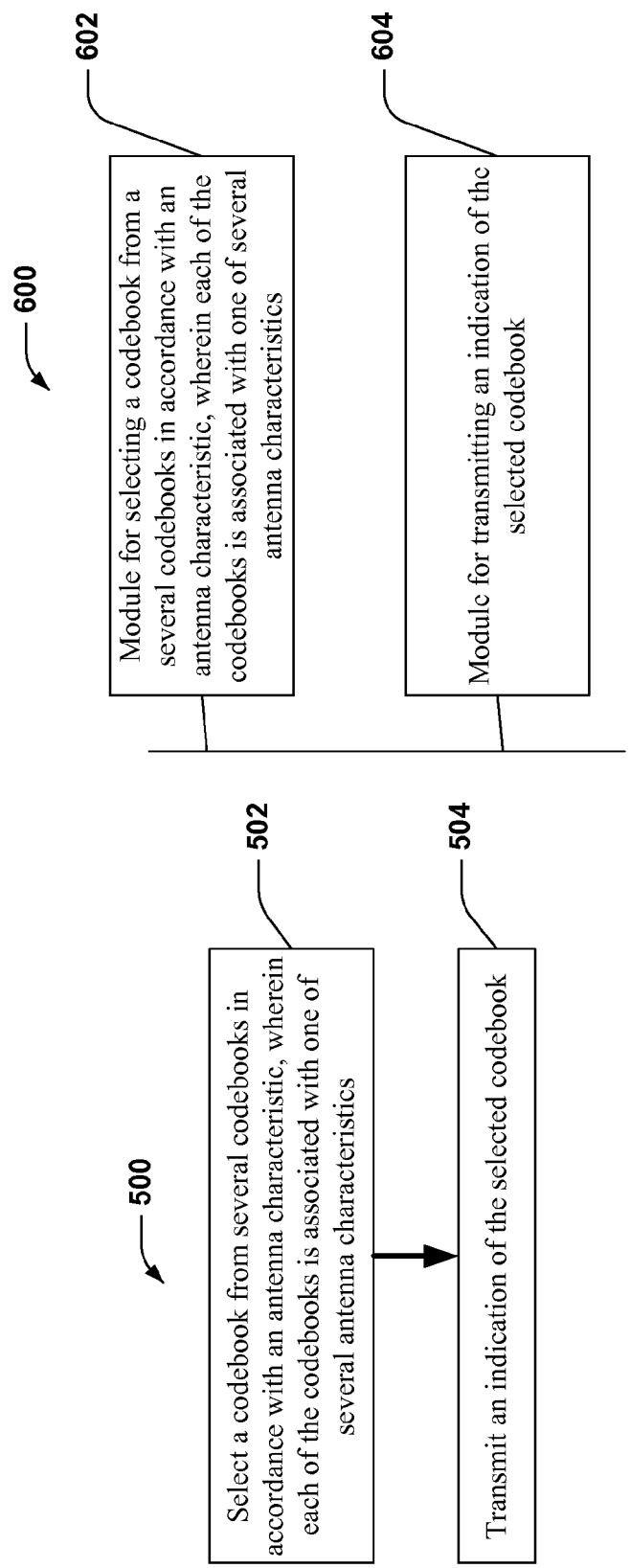

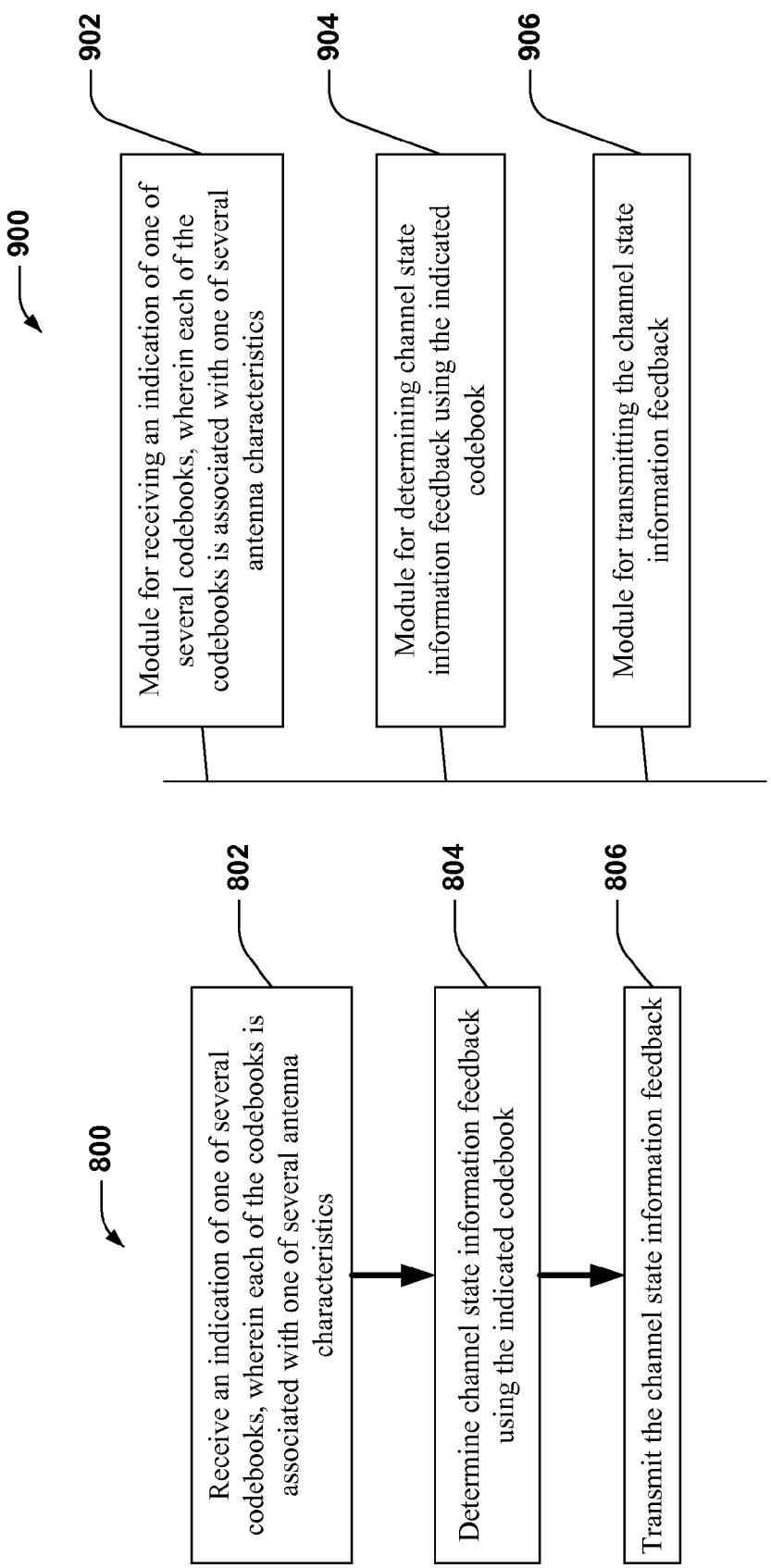

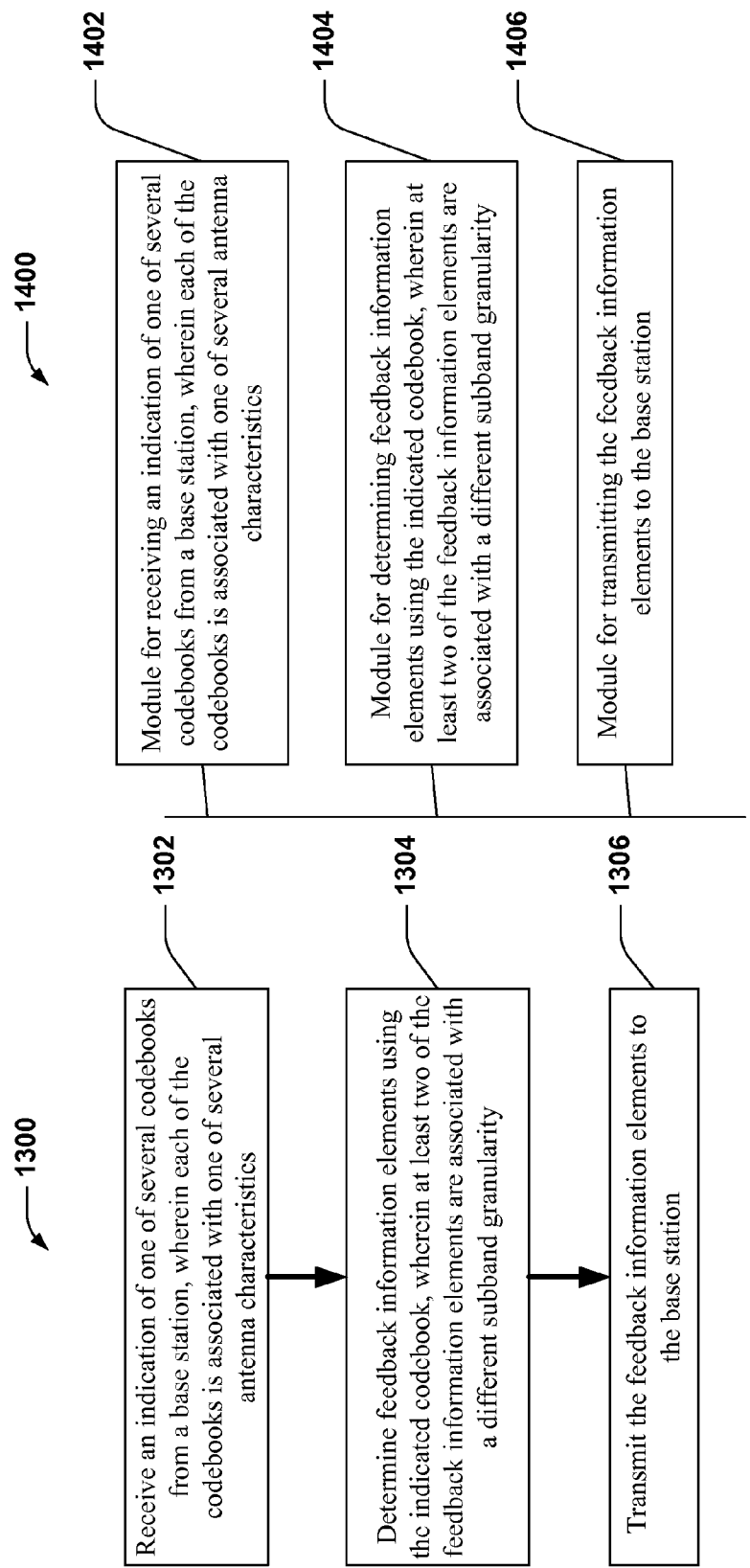

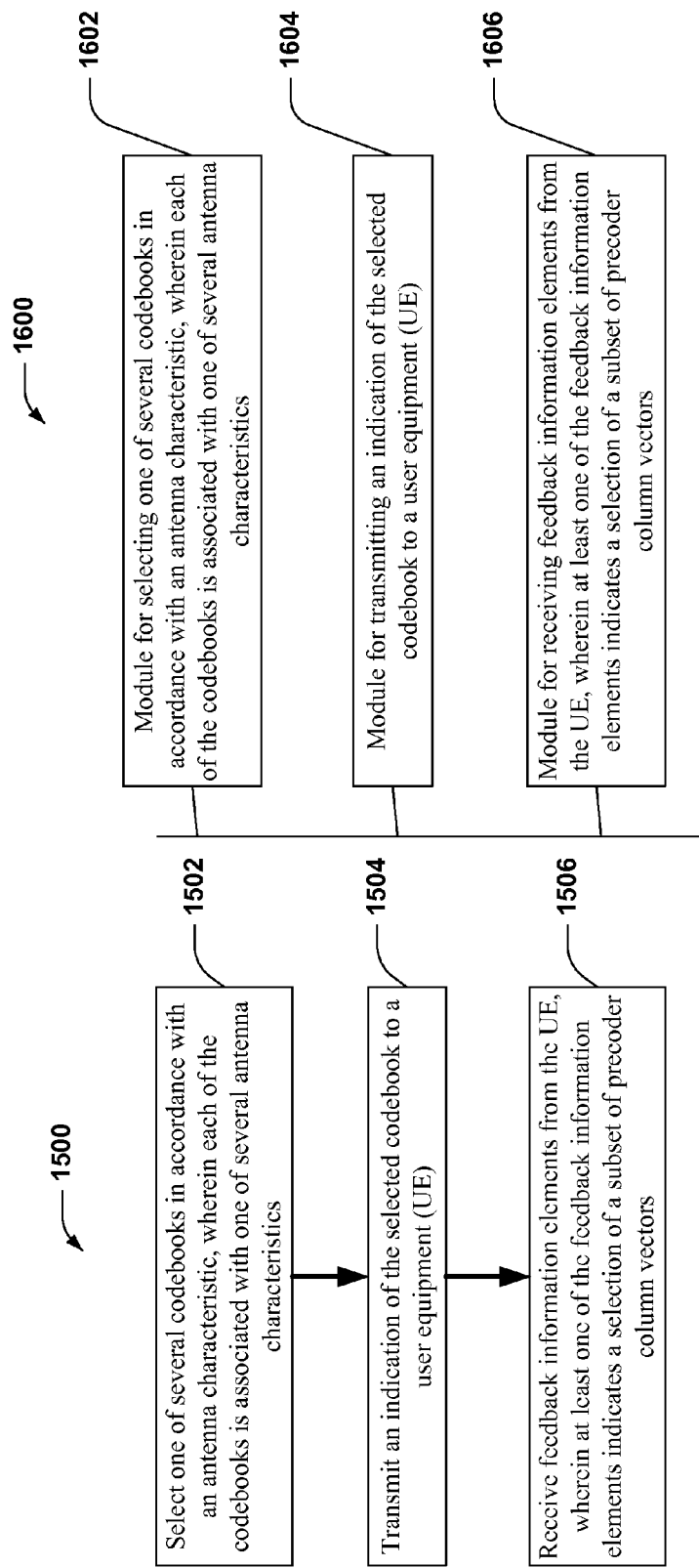

STRUCTURED MIMO CODEBOOK

CROSS-REFERENCE TO RELATED APPLICATIONS

This application claims the benefit of priority from U.S. Provisional Patent Application Ser. No. 61/358,368, entitled "STRUCTURED MIMO CODEBOOK," filed on Jun. 24, 2010, which is herein incorporated by reference in its entirety.

BACKGROUND

I. Field

The present disclosure relates generally to communication, and more specifically to techniques for generating and using codebooks in multiple-input-multiple-output (MIMO) wireless communication system.

II. Relevant Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

Generally, a wireless multiple-access communication system may concurrently support communication for multiple terminals that communicate with one or more base stations via transmissions on downlink and uplink. The downlink refers to the communication link from the base stations to the terminals, and the uplink refers to the communication link from the terminals to the base stations. This communication link may be established via a single-in-single-out (SISO), multiple-in-single-out (MISO) or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Generally, each of the NS independent channels corresponds to a dimension. The MIMO system may provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the downlink and uplink transmissions are on the same frequency region so that the reciprocity principle allows estimation of the downlink channel from the uplink channel. This enables an access point to extract transmit beam-forming gain on the uplink when multiple antennas are available at the access point.

Development of mobile wireless broadband networks, or telecommunication networks, has been directed primarily to improving various aspects of network performance (e.g., data rates, network latency, control overhead, resource utilization . . . ) within an allocated bandwidth in order to offer subscribers a better experience and ensuing perceived quality of service when utilizing applications which demand high data throughputs. In communication systems (e.g., LTE Advanced (LTE-A) Release 10), uplink (UL) spatial multiplexing of up to four layers is supported with wide-band precoding (e.g., application of a single precoding matrix per UL component carrier). In wide-band precoding, single-carrier waveform may be maintained at each antenna in a set of antennas in a user equipment (UE) and, generally, a single precoding matrix indicator (PMI) is signaled.

Advanced telecommunication networks may include a number of base stations that may support communication for a number of UEs. A base station may include multiple transmit and/or receive antennas. Each UE may include multiple transmit and/or receive antennas. For downlink (DL) transmissions, base stations may select a precoder (e.g., precoding matrix) of a codebook used for precoding the transmitted signals. The selection of codebook by a base station may depend, in part, on feedback signals received from UEs. Some systems, such as LTE Release 8 (referred to as "Rel-8" in this disclosure) may not support codebooks for greater than four transmit or receive antennas.

SUMMARY

The following presents a simplified summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one aspect, a method for wireless communication includes selecting a codebook from a plurality of codebooks in accordance with an antenna characteristic and transmitting an indication of the selected codebook. Each of the plurality of codebooks is associated with one of a plurality of antenna characteristics.

In another aspect, an apparatus for wireless communication includes means selecting a codebook from a plurality of codebooks in accordance with an antenna characteristic and means for transmitting an indication of the selected codebook. Each of the plurality of codebooks is associated with one of a plurality of antenna characteristics.

In yet another aspect, an apparatus for wireless communication includes at least one processor configured to select a codebook from a plurality of codebooks in accordance with an antenna characteristic and to transmit an indication of the selected codebook. Each of the plurality of codebooks is associated with one of a plurality of antenna characteristics. The apparatus further includes a memory coupled to the at least one processor.

In yet another aspect, a computer program product including a computer-readable medium storing computer-executable instructions is disclosed. The instructions include instructions for causing at least one processor to select a codebook from a plurality of codebooks in accordance with an antenna characteristic and instructions for causing the at least one processor to transmit an indication of the selected codebook. Each of the plurality of codebooks is associated with one of a plurality of antenna characteristics.

In yet another aspect, a method for wireless communication includes receiving an indication of a codebook of a plurality of codebooks, determining channel state information feedback using the codebook of the plurality of codebooks, and transmitting the channel state information feedback. Each of the plurality of codebooks is associated with one of a plurality of antenna characteristics.

In yet another aspect, an apparatus for wireless communication includes means for receiving an indication of a codebook of a plurality of codebooks, means for determining channel state information feedback using the codebook of the plurality of codebook, and means for transmitting the channel state information feedback. Each of the plurality of codebooks is associated with one of a plurality of antenna characteristics.

In yet another aspect, an apparatus for wireless communication includes at least one processor configured to receive an indication of a codebook of a plurality of codebooks, to determine channel state information feedback using the codebook of the plurality of codebooks, and to transmit the channel state information feedback. Each of the plurality of codebooks is associated with one of a plurality of antenna characteristics. The apparatus further includes a memory coupled to the at least one processor.

In yet another aspect, a computer program product including a non-transitory computer-readable medium storing computer-executable instructions is disclosed. The instructions include instructions for causing at least one processor to receive an indication of a codebook of a plurality of codebooks, instructions for causing the at least one processor to determine channel state information feedback using the codebook of the plurality of codebooks, and instructions for causing the at least one processor to transmit the channel state information feedback. Each of the plurality of codebooks is associated with one of a plurality of antenna characteristics.

In yet another aspect, a method for wireless communication includes receiving a plurality of channel phase feedback information elements from a user equipment. At least two of the plurality of channel phase feedback information elements are associated with a different subband granularity.

In yet another aspect, an apparatus for wireless communication includes means for receiving a plurality of channel phase feedback information elements from a user equipment. At least two of the plurality of channel phase feedback information elements are associated with a different subband granularity In yet another aspect, a method for wireless communication includes determining a plurality of channel phase feedback information elements using a codebook of the plurality of codebooks and transmitting the plurality of channel phase feedback information elements to a base station. At least two of the plurality of channel phase feedback information elements are associated with a different subband granularity.

In yet another aspect, an apparatus for wireless communication includes means for determining a plurality of channel phase feedback information elements using a codebook of the plurality of codebooks and means for transmitting the plurality of channel phase feedback information elements to a base station. At least two of the plurality of channel phase feedback information elements are associated with a different subband granularity.

In yet another aspect, a method for wireless communication includes receiving a plurality of feedback information elements from a user equipment. At least one of the plurality of feedback information elements indicates a selection of a subset of precoder column vectors.

In yet another aspect, an apparatus for wireless communication includes means for receiving a plurality of feedback information elements from a user equipment. At least one of the plurality of feedback information elements indicates a selection of a subset of precoder column vectors.

In yet another aspect, a method for wireless communication includes receiving an indication of a codebook of a plurality of codebooks from a base station, wherein each of the plurality of codebooks is associated with one of a plurality of antenna characteristics, determining a plurality of feedback information elements using the codebook of the plurality of codebooks, wherein at least one of the plurality of feedback information elements indicates a selection of a subset of precoder column vectors, and transmitting the plurality of feedback information elements to the base station.

In yet another aspect, an apparatus for wireless communication includes means for receiving an indication of a codebook of a plurality of codebooks from a base station, wherein each of the plurality of codebooks is associated with one of a plurality of antenna characteristics, means for determining a plurality of feedback information elements using the codebook of the plurality of codebooks, wherein at least one of the plurality of feedback information elements indicates a selection of a subset of precoder column vectors, and means for transmitting the plurality of feedback information elements to the base station.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIGS. 4A-F illustrate exemplary transmit antenna configurations, in accordance with certain configurations disclosed in the present disclosure.

FIG. 5 is a flow chart representation of a process for wireless communication.

FIG. 6 is a block diagram representation of a portion of a wireless communication apparatus.

FIG. 8 is a flow chart representation of a process for wireless communication.

FIG. 9 is a block diagram representation of a portion of a wireless communication apparatus.

FIG. 13 is a flow chart representation of a process for wireless communication.

FIG. 14 is a block diagram representation of a portion of a wireless communication apparatus.

FIG. 15 is a flow chart representation of a process for wireless communication.

FIG. 16 is a block diagram representation of a portion of a wireless communication apparatus.

DESCRIPTION

Figure 1:
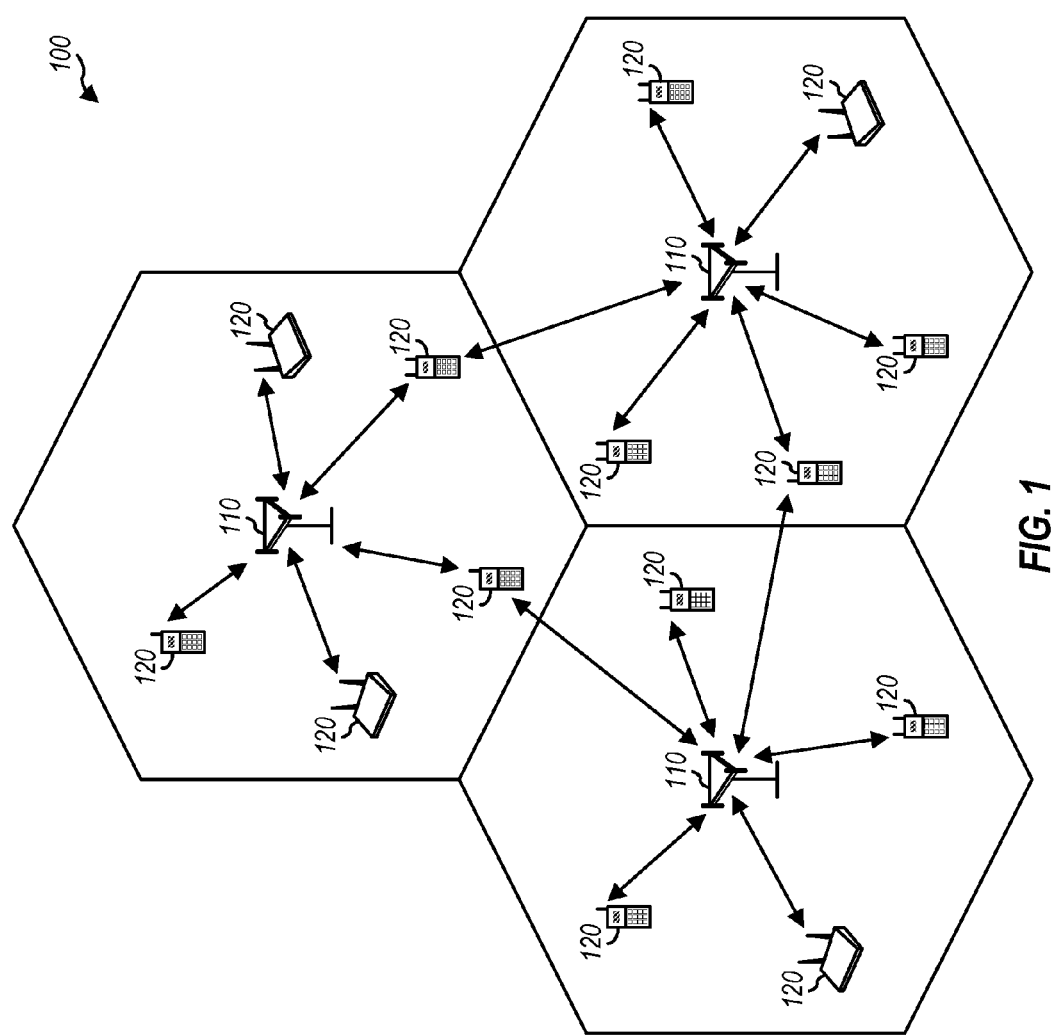
FIG. 1 illustrates a multiple access wireless communication system according to one embodiment.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as CDMA networks, TDMA networks, FDMA networks, OFDMA networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below. However, the various aspects described herein may be implemented in most any or any telecommunication network, and associated radio technology protocols.

SC-FDMA utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently used for uplink multiple access scheme in LTE, or Evolved UTRA. There may also be other waveforms with low PAPR, such as clustered SC-FDMA signals, CDMA signals with certain code channel configurations, OFDMA signals after applying certain PAPR reduction techniques, or generally any low PAPR signal. For illustrative purposes the systems and methods described herein reference SC-FDMA signals, however the systems and methods apply equally to any other low PAPR signals.

One of the enhancements considered for DL in LTE Release 10 was the support for eight transmit antennas and eight receive antennas (8×8) for single user MIMO (SU-MIMO) and multi-user MIMO (MU-MIMO). The structured codebook schemes disclosed in the present disclosure may be used in the Release 10 specification, or any subsequent specification or similar systems. In certain configurations, the structured codebooks may exhibit the following properties: (1) use and support 8-PSK alphabet, (2) codebook entries having constant modulus, and (3) nested structure. In certain configurations, one or more (but not all) of the listed properties may be satisfied by the disclosed codebooks. In some situations one or more of the properties may be relaxed if there is a demonstrable benefit better systems performance by doing so.

In a communication system comprising eight transmit antennas, several transmit antenna configurations for DL transmission are possible, for example, eight uniform linear array (ULA) antennas, four ULA antennas, eight cross-polarized (x-pol) antennas, and so on. In certain aspects, the structured codebook representations disclosed in the present disclosure provide for a parameterized description of codebooks, which is responsive to a configuration of transmit antennas. A transmitter (e.g., a base station) may be able to optimize transmission for various transmit antenna configurations by simply adjusting or choosing values of the parameters. Furthermore, a base station may assign a different number of subcarriers, or resource blocks (RBs), to different parameters of the structured codebook for signaling in the uplink direction by a UE. The base station may indicate the subcarrier assignment to the UE in a downlink message.

FIG. 1 shows an exemplary wireless communication system 100, which may be an LTE system or some other system. The exemplary system 100 may utilize a structured codebook, such as in accordance with aspects described herein. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" may refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, mobile device, a terminal, an access terminal, a subscriber unit, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes OFDM on the downlink and SC-FDM on the uplink. OFDM and SC-FDM partition a frequency range into multiple ($K_S$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_S$) may be dependent on the system bandwidth. For example, $K_S$ may be equal to 128, 256, 512, 1024 or 2048 for system bandwidth of 1.4, 3, 5, 10 or 20 MHz, respectively. The system bandwidth may correspond to a subset of the $K_S$ total subcarriers.

Figure 2:
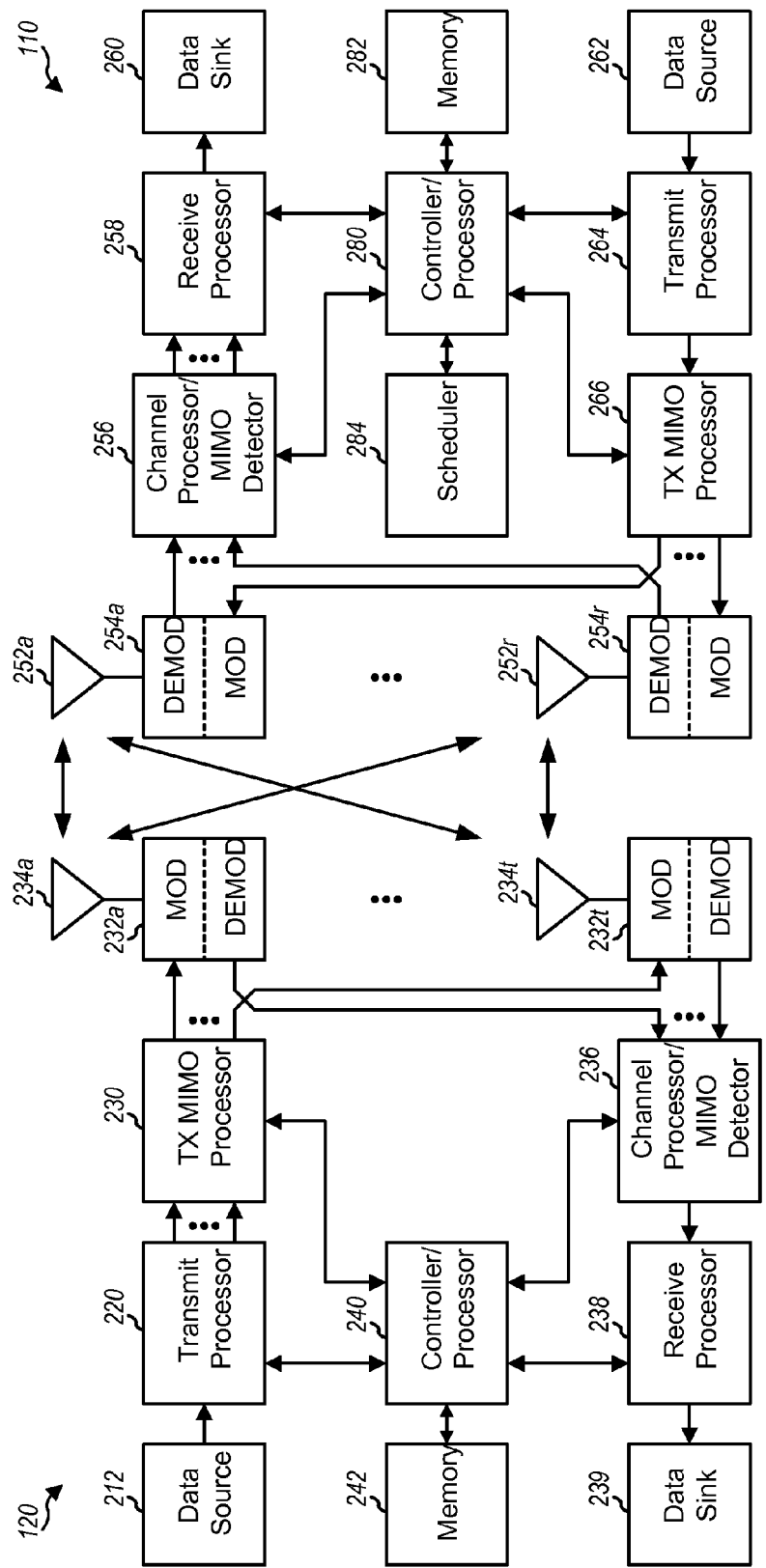
FIG. 2 illustrates a block diagram of a communication system.

FIG. 2 shows a block diagram of an exemplary base station 110 and UE 120, which may be one of the eNBs and one of the UEs in FIG. 1. The UE 120 may be equipped with T antennas 234a through 234t, and the base station 110 may be equipped with R antennas 252a through 252r, where in general T≥1 and R≥1.

At UE 120, a transmit processor 220 may receive data from a data source 212 and control information from a controller/processor 240. Transmit processor 220 may process (e.g., encode, interleave, and symbol map) the data and control information and may provide data symbols and control symbols, respectively. Transmit processor 220 may also generate one or more demodulation reference signals for multiple non-contiguous clusters based on one or more RS sequences assigned to UE 120 and may provide reference symbols. A transmit (TX) MIMO processor 230 may perform spatial processing (e.g., precoding) on the data symbols, the control symbols, and/or the reference symbols from transmit processor 220, if applicable, and may provide T output symbol streams to T modulators (MODs) 232a through 232t. Each modulator 232 may process a respective output symbol stream (e.g., for SC-FDMA, OFDM, etc.) to obtain an output sample stream. Each modulator 232 may further process (e.g., convert to analog, amplify, filter, and upconvert) the output sample stream to obtain an uplink signal. T uplink signals from modulators 232a through 232t may be transmitted via T antennas 234a through 234t, respectively.

At base station 110, antennas 252a through 252r may receive the uplink signals from UE 120 and provide received signals to demodulators (DEMODs) 254a through 254r, respectively. Each demodulator 254 may condition (e.g., filter, amplify, downconvert, and digitize) a respective received signal to obtain received samples. Each demodulator 254 may further process the received samples to obtain received symbols. A channel processor/MIMO detector 256 may obtain received symbols from all R demodulators 254a through 254r. Channel processor 256 may derive a channel estimate for a wireless channel from UE 120 to base station 110 based on the demodulation reference signals received from UE 120. MIMO detector 256 may perform MIMO detection/demodulation on the received symbols based on the channel estimate and may provide detected symbols. A receive processor 258 may process (e.g., symbol demap, deinterleave, and decode) the detected symbols, provide decoded data to a data sink 260, and provide decoded control information to a controller/processor 280.

On the downlink, at base station 110, data from a data source 262 and control information from controller/processor 280 may be processed by a transmit processor 264, precoded by a TX MIMO processor 266 if applicable, conditioned by modulators 254a through 254r, and transmitted to UE 120. At UE 120, the downlink signals from base station 110 may be received by antennas 234, conditioned by demodulators 232, processed by a channel estimator/MIMO detector 236, and further processed by a receive processor 238 to obtain the data and control information sent to UE 120. Processor 238 may provide the decoded data to a data sink 239 and the decoded control information to controller/processor 240.

Controllers/processors 240 and 280 may direct the operation at UE 120 and base station 110, respectively. Processor 220, processor 240, and/or other processors and modules at UE 120 may perform or direct process 800 of FIG. 8, process 1300 of FIG. 13, process 1700 of FIG. 17, and/or other processes for the techniques described herein. Processor 256, processor 280, and/or other processors and modules at base station 110 may perform or direct process 500 of FIG. 5, process 1100 of FIG. 11, process 1500 of FIG. 15, process 1900 of FIG. 19, and/or other processes for the techniques described herein. Memories 242 and 282 may store data and program codes for UE 120 and base station 110, respectively. A scheduler 284 may schedule UEs for downlink and/or uplink transmission and may provide allocations of resources (e.g., assignment of multiple non-contiguous clusters, RS sequences for demodulation reference signals, etc.) for the scheduled UEs.

Advances in digital communication have led to the use of multiple transmission antennas on UE 120. For example, in LTE Release 10, an SU-MIMO mode is defined, in which, a UE 120 may transmit up to two transport blocks (TBs) to the base station 110. TBs are also sometimes called codewords (CWs), although sometimes the mapping from TBs to CWs may follow a permutation, such as swapping two TBs mapped to a pair of CWs.

Figure 3:
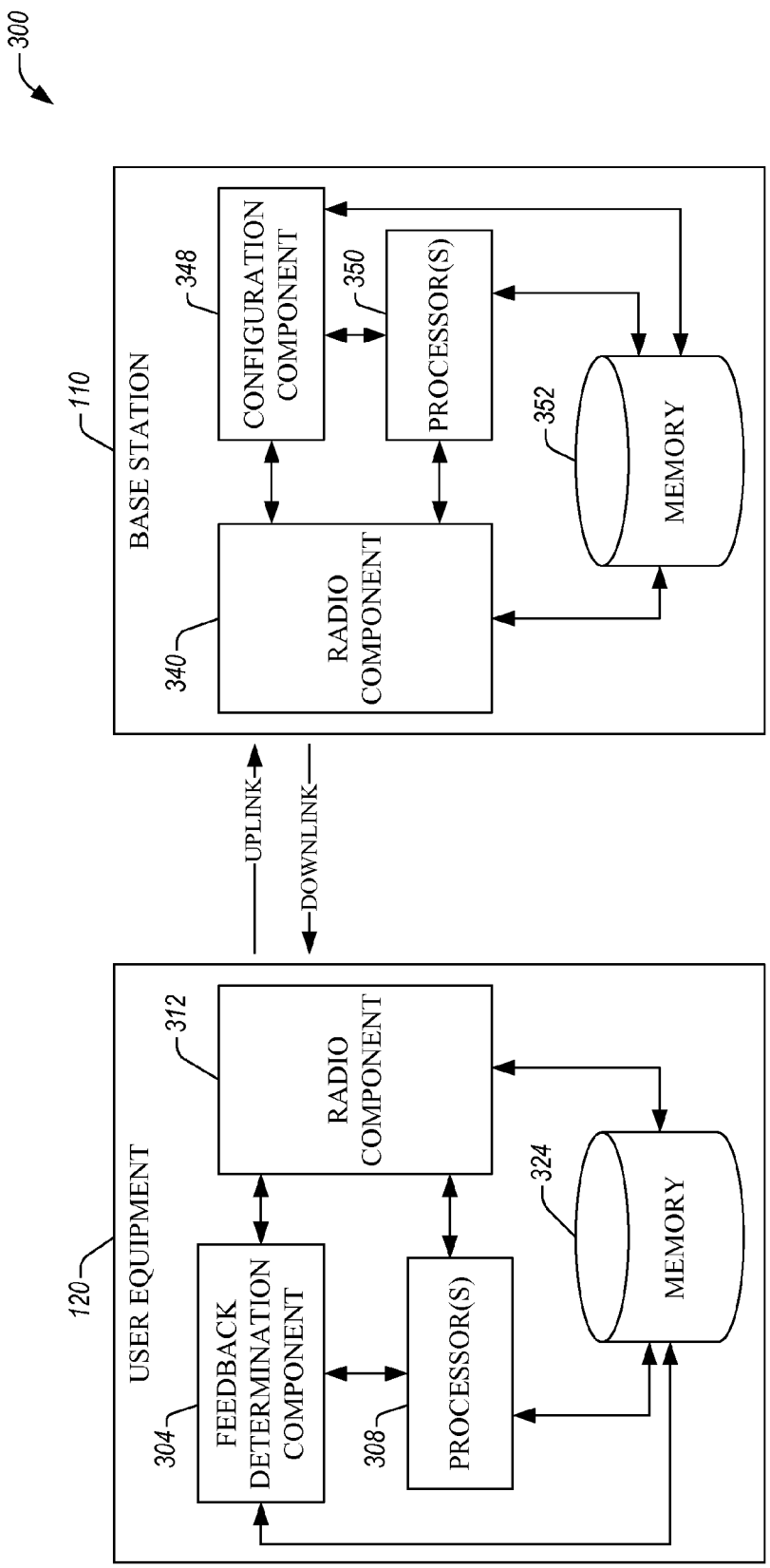
FIG. 3 illustrates a diagram of a communication system.

FIG. 3 shows a block diagram of an exemplary system 300 that may implement a structured codebook, such as in accordance with various aspects of the subject disclosure. In system 300, an exemplary base station 110 and exemplary UE 120, may be one of the eNBs and one of the UEs in FIGS. 1-2, or in other MIMO systems implementing a structured codebook, such as in accordance with aspects described herein UE 120 may include a feedback determination component 304, one or more processor(s) 308, a radio component 312, and memory 324. Feedback determination component 304 may determine feedback information elements using a codebook indicated by the base stations 110 in accordance with aspects described herein. Base station 110 may include a radio component 340, a configuration component 348, a processor 350, and memory 352. UE 120 may communicate (e.g., exchange data and signaling) with base station 110 through wireless uplink and downlink via the radio component 312.

In an aspect, UE 120 includes a memory 324 which may be a computer-readable storage medium, such as a non-transitory computer-readable medium, that retains code instructions that, when executed by processor(s) 308, implement the functionality in connection with receiving an indication of a codebook from the base station 110, determine feedback information using the indicated codebook, and transmit the feedback information to the base station 110 according to aspects described in the subject disclosure. It should be appreciated that in one or more embodiments, feedback determination component 304 and at least a portion of radio component 312 may reside within memory 324 as one or more sets of code instructions; in such one or more embodiments, functionality of feedback determination component 304 or at least the portion of radio component 312 may be implemented when processor(s) 308 execute the one or more set of code instructions. In additional or alternative embodiments, processor(s) 308 may be distributed as part of feedback determination component 304, or component(s) therein, or radio component 312, or component(s) therein. It should be appreciated that the various components that are part of UE 120 may exchange data via several communication protocols and related architecture, such as a bus architecture.

In another aspect, base station 110 includes a memory 352 which may be a computer-readable storage medium, such as a non-transitory computer-readable medium, that retains code instructions that, when executed by processor(s) 350, implement the functionality in connection with the structured codebook disclosed herein. It should be appreciated that in one or more embodiments, configuration component 348 and at least a portion of radio component 340 may reside within memory 352 as one or more sets of code instructions; in such one or more embodiments, functionality of configuration component 348 or at least the portion of radio component 340 is implemented when processor(s) 350 execute the one or more set of code instructions. In additional or alternative embodiments, processor(s) 350 may be distributed as part of configuration component 348, or component(s) therein, or radio component 340, or component(s) therein. It should be appreciated that the various components that are part of base station 110 may exchange data via several communication protocols and related architecture, such as a bus architecture.

FIGS. 4A-F are diagrammatic representations of various transmit antenna configurations, in accordance with configurations disclosed in the present disclosure.

FIG. 4A may represent a transmit antenna configuration 400 in which all eight antennas are phase aligned and closely spaced.

FIG. 4B may represent a transmit antenna configuration 402 comprising two antenna groups, spaced apart from each other, all antennas (e.g., all four antennas) within a group closely spaced and aligned with respect to each other.

FIG. 4C may represent a transmit antenna configuration 404 comprising two antenna groups; a first group of four closely spaced and aligned antennas, having cross-polarization with respect to a second group of four closely spaced and aligned antennas.

FIG. 4D may represent a transmit antenna configurations 406 in which antennas are arranged as four pairs of aligned antennas, with two closely spaced antennas forming a pair.

FIG. 4E may represent a transmit antenna configurations 408 in which antennas are arranged as four pairs of antennas, with each pair having two closely spaced, cross-polarized antennas, and each of the four pairs being spaced apart from each other.

FIG. 4F may represent a transmit antenna configuration 410 in which antennas are arranged as four antenna pairs, spaced apart from each other, with antennas in each pair closely spaced and cross-polarized with respect to each other.

It may be desirable to select different codebooks based on one or more transmit antenna characteristics, such as the different antenna configurations illustrated in FIGS. 4A-F. It may be desirable for such a codebook to have the following properties: (1) 8-PSK alphabet, (2) Constant modulus, and (3) Nested structure. However, one or more of these properties may be relaxed if there is a demonstrable benefit resulting in better systems performance. In general, a precoder may be a unitary matrix and a codebook may be a set of unitary transformations. Example transformation operations that preserve the unitary property may include:

O1. Permuting columns
O2. Multiplying columns with a unit norm complex scalar
O3. Permuting rows
O4. Multiplying rows with a unit norm complex scalar
O5. Left or right multiply with a unitary matrix However, operation (O5) may not strictly preserve constant modulus properties, and therefore may not be desirable for designing a codebook in some cases. In general, the operation (O2) above may be transparent when the matrix is used as a precoder. Operation (O1) may have an impact when the precoder is not full rank and the other transformations may in general change the coefficient values of a precoder.

In certain configurations, operations (O4) and (O1) above may be used as a part of a codebook design. In other words, starting from a base unitary matrix, precoders of a structured codebook may be obtained by multiplying rows by scalars primarily, and by permuting the columns in the non full rank cases.

With the use of demodulation reference signals (DM-RS), the nested structure property may not be as important, but may still be useful in enabling better MU-MIMO multiplexing for UEs reporting different ranks.

The Householder transformation used in certain codebooks (e.g., Rel-8) may not be extendable to 8 antennas without violating the constant modulus properties. In certain configurations according to the present disclosure, by transforming the Householder precoders by multiplying columns with a constant (which is completely transparent when the matrix is considered as a precoder) certain codebook design principle may be extendible to 8 antennas.

The 4×4 Rel-8 codebook is derived by using the Householder transformation, which generates an orthogonal matrix from an input 4×1 column vector $u_n$ by applying:

$$W_n = I - 2u_n u_n^H / u_n^H u_n \quad (1)$$

Considering $W_n$ as a precoder, columns may be multiplied with a unit norm constant scalar. $W_n$ may be transformed to $\tilde{W}_n$ by multiplying each columns with the elements of $u_n$:

$$\tilde{W}_n = W_n \cdot \text{diag}(u_n) \quad (2)$$

where $$\text{diag}(u_n) = \begin{bmatrix} u_1 & 0 & 0 & 0 \\ 0 & u_2 & 0 & 0 \\ 0 & 0 & u_3 & 0 \\ 0 & 0 & 0 & u_4 \end{bmatrix} \quad (3)$$

The result may be expressed as:

$$\tilde{W}_n = (I - 2u_n u_n^H / u_n^H u_n) \cdot \text{diag}(u_n) = \text{diag}(u_n) \cdot Q_{4\times 4} \quad (4)$$

where $$Q_{4\times 4} = \frac{1}{2} \cdot \begin{bmatrix} -1 & +1 & +1 & +1 \\ +1 & -1 & +1 & +1 \\ +1 & +1 & -1 & +1 \\ +1 & +1 & +1 & -1 \end{bmatrix} \quad (5)$$

Therefore, in Rel-8, all 4×4 precoders are derivable by taking a 4×1 column vector $u_n$ and right multiplying it with the same orthonormal matrix $Q_{4\times 4}$. Note that $Q_{4\times 4}$ itself is a transformation of the 4×4 Hadamard matrix by using operations (O1), (O2) and (O4) discussed above. In addition, column permutation was defined for the Rel-8 codebook for some rank 2, 3 precoders. This is specified as particular column selections for those cases in Rel-8.

In certain configurations disclosed in the present disclosure, similar design principles may be extended in constructing 8×8 codebooks. For clarity, the structured codebook construction is explained with respect to a rank 1 precoder. It is understood that a full rank precoder may be derived by simply right multiplying the rank 1 precoder with an orthonormal matrix.

According to certain configurations disclosed in the present disclosure, a codebook may be constructed as follows:

Define a set of $u_n$ rank 1 precoders where each $u_n$ is a 8×1 column vector. Each vector $u_n$ may have a dual codebook structure. Each precoder $W_n$ in the codebook may be derived as:

$$W_n = \text{diag}(u_n) \cdot Q_{8\times 8} \quad (6)$$

where $Q_{8\times 8}$ is a 8×8 Hadamard matrix after a bit-reversed column permutation:

$$Q_{8\times 8} = \frac{1}{2\cdot\sqrt{2}} \cdot \begin{bmatrix} +1 & +1 & +1 & +1 & +1 & +1 & +1 & +1 \\ +1 & +1 & +1 & +1 & -1 & -1 & -1 & -1 \\ +1 & +1 & -1 & -1 & +1 & +1 & -1 & +1 \\ +1 & +1 & -1 & -1 & -1 & -1 & +1 & +1 \\ +1 & -1 & +1 & -1 & +1 & -1 & +1 & -1 \\ +1 & -1 & +1 & -1 & +1 & -1 & +1 & -1 \\ +1 & -1 & -1 & +1 & +1 & -1 & -1 & +1 \\ +1 & -1 & -1 & +1 & -1 & +1 & +1 & -1 \end{bmatrix} \quad (7)$$

In addition, for certain antenna configurations, and for some rank cases, column permutations of the precoders may be considered, similar to the permutations performed in the Rel-8 codebook.

A number of transmit antenna configurations may be used at a base station (or eNB), such as the antenna configurations described in FIGS. 4A-F. The structured codebook disclosed herein allows adaptability by parameterizing a codebook and allowing selection of a codebook based on the transmit antenna configuration.

In certain configurations, each precoder is derived from a $u_n$ basis vector. The UE feedback may point to one of the $u_n$ basis vectors, and possibly to a column permutation. The latter may primarily target optimizing rank 2 feedback.

The vector $u_n$ may be expressed as a formula where the elements of $u_n$ are calculated based on discrete feedback components. However, it is understood that the set $\{u_n\}$ may be viewed just as a simple enumeration of a set of chosen vectors In certain configurations, the set $u_n = [u_{n,0}, u_{n,1}, u_{n,2}, \ldots, y_{n,7}]^T$ may be expressed as:

$$u_n = f(a_0, b_0, c_0, c_1, d_1, d_2, d_3) \quad (8)$$

i.e. as a function of a number of discrete parameters such that $$u_{n,k} = \exp(2\pi \cdot j \cdot (a_0 \cdot k + b_0 \cdot \lfloor (k+4)/8 \rfloor + c_0 \cdot \lfloor (k+6)/8 \rfloor + c_1 \cdot \lfloor (k+2)/8 \rfloor + d_1 \cdot \lfloor (k+5)/8 \rfloor + d_2 \cdot \lfloor (k+3)/8 \rfloor + d_3 \cdot \lfloor (k+1)/8 \rfloor)) \quad (9)$$

Note that not all parameters need to be used in deriving a codebook. For example, parameters that are not used may be set to zero in Eq. (9).

The parameters $(a_0, b_0, c_0, c_1, d_1, d_2, d_3)$ may relate to transmit antenna configurations. For example, $a_0$ may correspond to a rank 1 precoder and may represent the case when all antennas in the transmit antenna configuration are closely located and are in phase. For feedback of the parameter $a_0$, a greater number of subband RBs may be assigned because frequency variability will be less when the transmit antenna configuration corresponds to in phase, closely located antennas.

As another example, parameters $d_1$, $d_2$, $d_3$ may be more correlated than $b_0$, for example, therefore $d_1$, $d_2$, $d_3$ may have lower subband granularity than $b_0$. In other words, a greater number of subband resource blocks may be assigned to $d_1$, $d_2$, $d_3$ for feedback by a UE, compared to that for $b_0$.

In certain configurations, signaling is selected from the four basic configurations listed in Table 1 below.

TABLE 1

Feedback Configuration Cases

| Configuration number | Tx antenna configurations covered | Wideband feedback parameter set | Subband feedback parameter set | Column permutation set |
|---|---|---|---|---|
| 1 | FIG. 4A | $a_0$ | $a_0, b_0, c_0, c_1, d_1, d_2, d_3$ | N/A |
| 2 | FIG. 4B, FIG. 4C | $a_0, b_0$ | $a_0, b_0, c_0, c_1, d_1, d_2, d_3$ | N/A |
| 3 | FIG. 4D, FIG. 4E | $a_0, b_0, c_0, c_1$ | $a_0, b_0, c_0, c_1, d_1, d_2, d_3$ | {[1 2 3 4 5 6 7 8], [1 3 4 2 5 6 7 8], [1 4 2 3 5 6 7 8]} |
| 4 | FIG. 4F | $a_0, b_0, c_0, c_1, d_1, d_2, d_3$ | $a_0, b_0, c_0, c_1, d_1, d_2, d_3$ | {[1 2 3 4 5 6 7 8], [1 3 4 2 5 6 7 8], [1 4 2 3 5 6 7 8]} |

The signaling for configuration selection could be cell-specific although if more flexibility in feedback configuration is desired, UE-specific signaling could be considered. In Table 1 above, four example transmit antenna configurations, corresponding to four rows in Table 1, are shown. As discussed previously, wideband parameter set for the transmit antenna configuration 400 of FIG. 4A comprises $a_0$. For the transmit antenna configurations 402 and 404 of FIGS. 4B and 4C, respectively, an additional parameter $b_0$ may be added, for example, corresponding to the additional feature that antennas are grouped either with different phases or are spaced apart in two groups. Similarly, additional parameters $c_0$, $c_1$, $d_1$, $d_2$, and $d_3$ for representing additional transmit antenna configuration details depicted in configurations 406, 408 and 410 of FIGS. 4D, 4E, and 4F, respectively.

In certain configurations, the set of parameters, the bit resolution used for each parameter, and the subcarrier resource blocks assigned for feedback of each parameter from a UE to a base station/eNB, may be determined based on the number of transmit antenna configurations supported. Two illustrative examples are given below in Tables 2 and 3.

TABLE 2

Feedback Configuration for 8 Tx ULA

| Tx antenna configuration | Feedback parameter | Values | Number of bits | Subband size (RBs) |
|---|---|---|---|---|
| FIG. 4A | $a_0$ | {0, 1/8, 2/8, ..., 7/8} | 3 | 50 |
| | $b_0$ | {0, 1/8} | 1 | 6 |
| | $c_0$ | {0, 1/8} | 1 | 12 |
| | $c_1$ | {0, 1/8} | 1 | 12 |
| | $d_1$ | {0, 1/8} | 1 | 24 |
| | $d_2$ | {0, 1/8} | 1 | 24 |
| | $d_3$ | {0, 1/8} | 1 | 24 |

Table 2 above relates to the antenna configuration 400 depicted in FIG. 4A, and Table 3 below relates to the antenna configuration 410 depicted in FIG. 4F. The second column may show the feedback parameters used to characterize and/or construct codebooks. The third column may show the values that may be assigned to each parameter. The fourth column may list a number of bits required to signal value of the parameter in a feedback message from a UE to a base station. The last column may list the number of subbands or resource blocks (RBs) over which a given parameter is assumed to be constant. For example, parameter $a_0$ may represent aligned set of closely spaced antennas, and therefore may not vary over a frequency band. Therefore, $a_0$ is assumed to be unchanging over a subband size of 50 RBs (e.g., the entire 10 MHz bandwidth). In certain configurations, the size of subbands allocated to a parameter may be a multiple of 6 RBs, to be consistent with the Rel-8 RB assignment.

Still referring to Tables 2 and 3, parameter $b_0$ may be associated with cross-polarized (e.g., as depicted in FIG. 4C). Therefore, to mitigate possible spectral variations, the feedback channel for $b_0$ may be assigned a smaller number of RBs (e.g., six). Likewise, a different number of RBs may be assigned to $c_0$, $c_1$ (exhibiting larger frequency variations due to cross polarization and farther spacing of antennas) and $d_1$, $d_2$, and $d_3$ (exhibiting less frequency variation than $c_0$, $c_1$ due to nearer spacing of antennas). In certain configurations, when a parameter is assigned fewer number of RBs, to cover the entire bandwidth of the DL channel, a greater number of parameter updates may have to be signaled on the feedback channel from a UE to a base station.

TABLE 3

Feedback Configuration for 8 Tx x-pol

| Tx antenna configuration | Feedback parameter | Values | Number of bits | Subband size (RBs) |
|---|---|---|---|---|
| FIG. 4F | $a_0$ | {0, 1/8, 2/8, . . . , 7/8} | 3 | 50 |
| | $b_0$ | Rank 1: {0, 1/4, 1/2, 3/4} | Rank 1: 2 | 6 |
| | | Rank 2: {0, 1/4} | Rank 2: 1 | |
| | $c_0$ | {0, 1/8} | 1 | 12 |
| | $c_1$ | {0, 1/8} | 1 | 12 |
| | $d_1$ | Rank 1: {0} | Rank 1: 0 | 24 |
| | | Rank 2: {0, 1/8} | Rank 2: 1 | |
| | $d_2$ | Rank 1: {0} | Rank 1: 0 | 24 |
| | | Rank 2: {0, 1/8} | Rank 2: 1 | |
| | $d_3$ | Rank 1: {0} | Rank 1: 0 | 24 |
| | | Rank 2: {0, 1/8} | Rank 2: 1 | |

Other configurations may also be possible. For example, higher feedback granularity on the feedback channel may give better DL spectral efficiency vs. UL feedback overhead trade off Referring to Tables 2 and 3, as an example, in a wireless system with 10 MHz downlink bandwidth, a subband size of 50 RBs may correspond to the entire DL bandwidth. Therefore, the entry $a_0$ may have to be sent on the feedback channel just once for the entire bandwidth. On the other hand, $b_0$ is assigned 6 subband RBs, requiring a UE to send nine different values of $b_0$ to span the entire 50 RB bandwidth of the 10 MHz channel.

FIG. 5 is a flow chart representation of a wireless communication methodology 500. At box 502, a codebook is selected from several codebooks in accordance with an antenna characteristic, such as a transmit antenna configuration. Each of the codebooks may be associated with one of several antenna characteristics, such as the transmit antenna configurations illustrated in FIGS. 4A-F.

At box 504, an indication of the selected codebook is transmitted, such as to a UE 120. In one example, the indication of the selected codebook may include less information than the codebook itself. For example, all of the codebooks may be known to a UE 120, such as stored locally at the UE 120, and a base station 110 may only need to signal an indication of the selected codebook, rather than the entire selected codebook. The methodology 500 may further include receiving channel state information feedback from the UE 120 and determining downlink scheduling and/or precoding based on the channel state information feedback. The channel state information feedback may include feedback information elements, such as the wideband and/or subband feedback parameters discussed above and shown in Tables 1-3. In one example, at least two of the feedback information elements may be associated with a different subband granularity, as discussed above. For example, at least two of the feedback information elements, such as the wideband and/or subband feedback parameters, may be assigned a different number of resource blocks (RBs), as discussed above. Alternatively, or in addition, at least one of the feedback information elements may indicate a selection of a subset of precoder column vectors. For example, at least one of the feedback information elements may include a column permutation set, such as one of the column permutation sets shown in Table 1. The base station 110 may use the indicated subset of precoder column vectors to determine one or more precoders for precoding a signal. Alternatively, or in addition, at least one of the feedback information elements may include a channel phase feedback information element that indicates a phase offset between two groups of transmit antennas, such as the feedback parameter $b_0$ discussed above. In this example, the first group of transmit antennas may be [0, 1, . . . , m], and the second group of transmit antennas may be [m+1, m+2, . . . Ntx−1], wherein Ntx is the total number of the transmit antennas, and m corresponds to the at least one feedback information elements. Alternatively or in addition, the channel phase feedback information element may include other information related to the channel phase.

FIG. 6 is a block diagram representation of a portion of a wireless communication apparatus 600. Module 602 is provided for selecting a codebook from several codebooks in accordance with an antenna characteristic, such as a transmit antenna configuration. Each of the codebooks may be associated with one of several antenna characteristics, such as the transmit antenna configurations illustrated in FIGS. 4A-F. Module 604 is provided for transmitting an indication of the selected codebook, such as to a UE 120. In one example, the indication of the selected codebook may include less information than the codebook itself.

Figure 7:
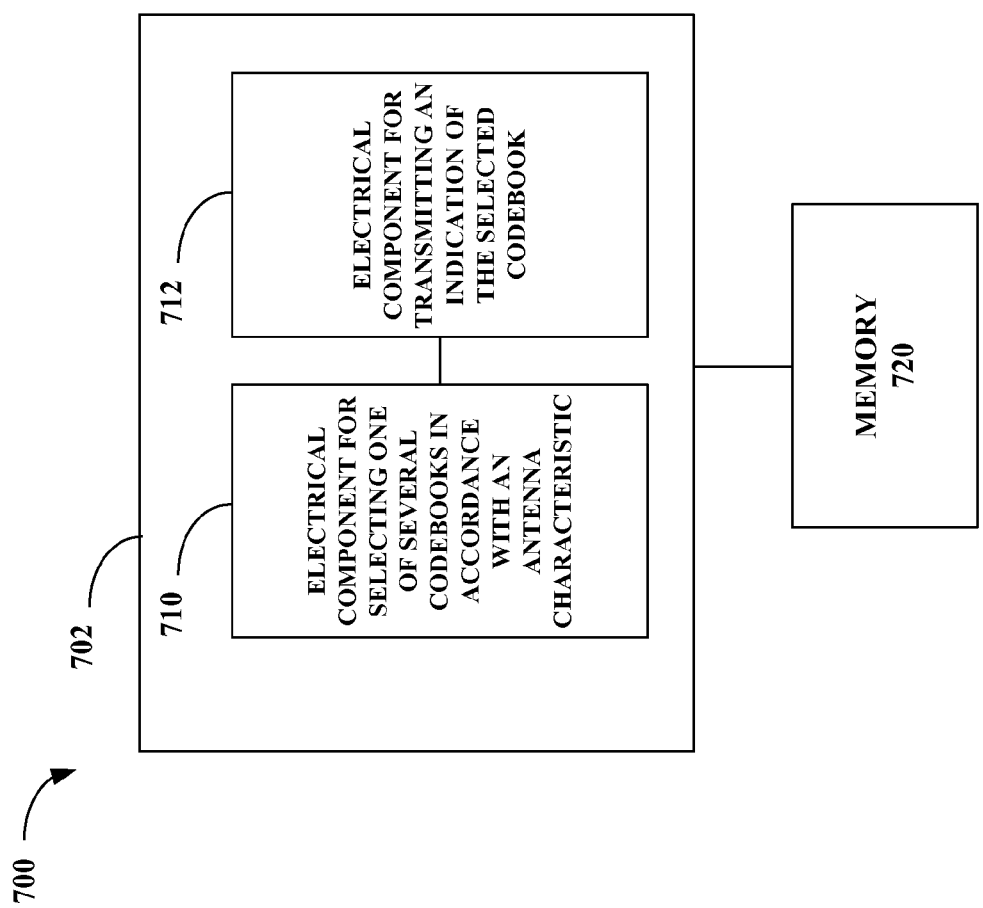
FIG. 7 illustrates an exemplary coupling of electrical components that facilitates implementing a structured codebook.

FIG. 7 is a block diagram of a system 700 that facilitates implementing a structured codebook, according to an embodiment. System 700 includes functional blocks that may represent functions implemented by a processor, software, or combination thereof (e.g., firmware), wherein system 700 includes a logical grouping 702 of electrical components that may act in conjunction. As illustrated, logical grouping 702 may include an electrical component for selecting a codebook from several codebooks in accordance with an antenna characteristic 710, such as a transmit antenna configuration, as well as an electrical component for transmitting an indication of the selected codebook 712, such as to a UE 120. For example, each of the codebooks may be associated with one of several antenna characteristics, such as the transmit antenna configurations illustrated in FIGS. 4A-F, and the indication of the codebook may include less information than the codebook itself. In another aspect, channel state information feedback may be received from the UE 120, and downlink scheduling and/or precoding may be determined based on the channel state information feedback. The channel state information feedback may include feedback information elements. In one example, at least two of the feedback information elements may be associated with a different subband granularity, as discussed above. Alternatively, or in addition, at least one of the feedback information elements may indicate a selection of a subset of precoder column vectors. Alternatively, or in addition, at least one of the feedback information elements may indicate a phase offset between two groups of transmit antennas. In this example, the first group of transmit antennas may be [0, 1, . . . , m], and the second group of transmit antennas may be [m+1, m+2, . . . Ntx−1], wherein Ntx is the total number of the transmit antennas, and m corresponds to the at least one feedback information elements. Additionally, system 700 may include a memory 720, such as a non-transitory computer-readable medium, that retains instructions for executing functions associated with electrical components 710 and 712, wherein any of electrical components 710 and 712 may exist either within or outside memory 720.

FIG. 8 is a flow chart representation of a wireless communication methodology 800. At box 802, an indication of one of several codebooks is received, such as from a base station. Each of the codebooks may be associated with one of several antenna characteristics, such as the transmit antenna configurations illustrated in FIGS. 4A-F. In one example, the indication of the selected codebook may include less information than the codebook itself. For example, each of the several codebooks may be stored in a memory and the received indication of one of the codebooks may be used to retrieve the indicated codebook from the memory.

At box 804, channel state information feedback may be determined using the indicated codebook. The channel state information feedback may include several feedback information elements, such as the wideband and/or subband feedback parameters discussed above and shown in Tables 1-3. In one example, at least two of the feedback information elements may be associated with a different subband granularity, as discussed above. For example, at least two of the feedback information elements, such as the wideband and/or subband feedback parameters, may be assigned a different number of resource blocks (RBs), as discussed above. Alternatively, or in addition, at least one of the feedback information elements may indicate a selection of a subset of precoder column vectors. For example, at least one of the feedback information elements may include a column permutation set, such as one of the column permutation sets shown in Table 1. Alternatively, or in addition, at least one of the feedback information elements may indicate a phase offset between two groups of transmit antennas, such as the feedback parameter $b_0$ discussed above. In this example, the first group of transmit antennas may be [0, 1, . . . , m], and the second group of transmit antennas may be [m+1, m+2, . . . Ntx−1], wherein Ntx is the total number of the transmit antennas, and m corresponds to the at least one feedback information elements.

At box 806, the channel state information feedback may be transmitted, such as to a base station 110. The transmitted channel state information feedback may include the feedback information elements.

FIG. 9 is a block diagram representation of a portion of a wireless communication apparatus 900. Module 902 is provided for receiving an indication of one of several codebooks. Each of the codebooks may be associated with one of several antenna characteristics, such as the transmit antenna configurations illustrated in FIGS. 4A-F. In one example, the indication of the selected codebook may include less information than the codebook itself. For example, each of the several codebooks may be stored in a memory and the received indication of one of the codebooks may be used to retrieve the indicated codebook from the memory. The channel state information feedback may include several feedback information elements. Module 904 is provided for determining channel state information feedback using the indicated codebook. Module 906 is provided for transmitting the channel state information feedback, such as to a base station 110. The transmitted channel state information feedback may include the feedback information elements.

Figure 10:
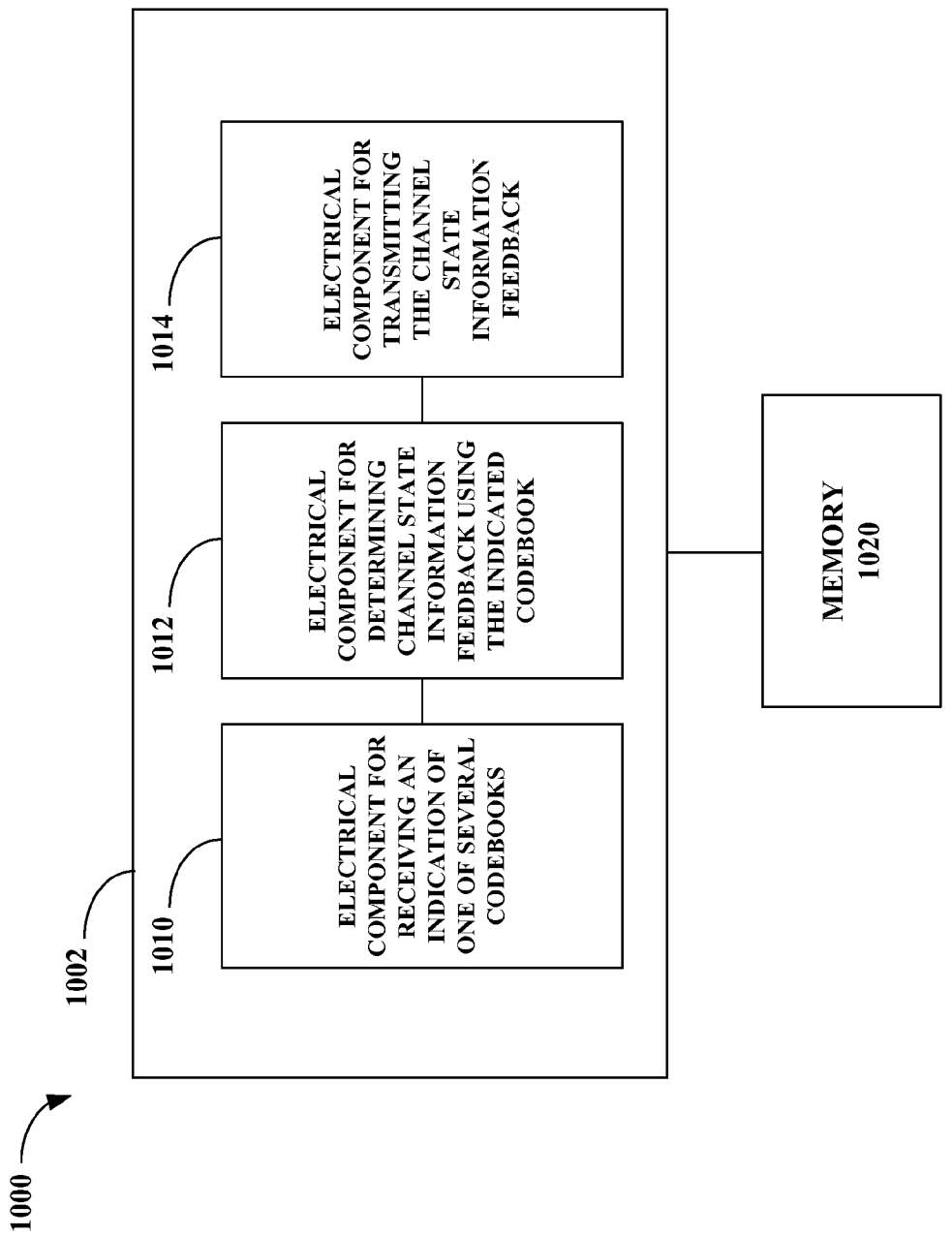
FIG. 10 illustrates an exemplary coupling of electrical components that facilitates implementing a structured codebook.

FIG. 10 is a block diagram of a system 1000 that facilitates implementing a structured codebook, according to an embodiment. System 1000 includes functional blocks that may represent functions implemented by a processor, software, or combination thereof (e.g., firmware), wherein system 1000 includes a logical grouping 1002 of electrical components that may act in conjunction. As illustrated, logical grouping 1002 may include an electrical component for receiving an indication of one of several codebooks 1010, an electrical component for determining channel state information feedback using the indicated codebook 1012, and an electrical component for transmitting the channel state information feedback. For example, each of the codebooks may be associated with one of several antenna characteristics, such as the transmit antenna configurations illustrated in FIGS. 4A-F, and the indication of the codebook may include less information than the codebook itself. In another aspect, channel state information feedback may be transmitted to a base station 110. The channel state information feedback may include feedback information elements. In one example, at least two of the feedback information elements may be associated with a different subband granularity, as discussed above. Alternatively, or in addition, at least one of the feedback information elements may indicate a selection of a subset of precoder column vectors. Alternatively, or in addition, at least one of the feedback information elements may indicate a phase offset between two groups of transmit antennas. In this example, the first group of transmit antennas may be [0, 1, . . . , m], and the second group of transmit antennas may be [m+1, m+2, . . . Ntx−1], wherein Ntx is the total number of the transmit antennas, and m corresponds to the at least one feedback information elements. Additionally, system 1000 may include a memory 1020, such as a non-transitory computer-readable medium, that retains instructions for executing functions associated with electrical components 1010, 1012, and 1014, wherein any of electrical components 1010, 1012, and 1014 may exist either within or outside memory 1020.

Figures 11, 12:
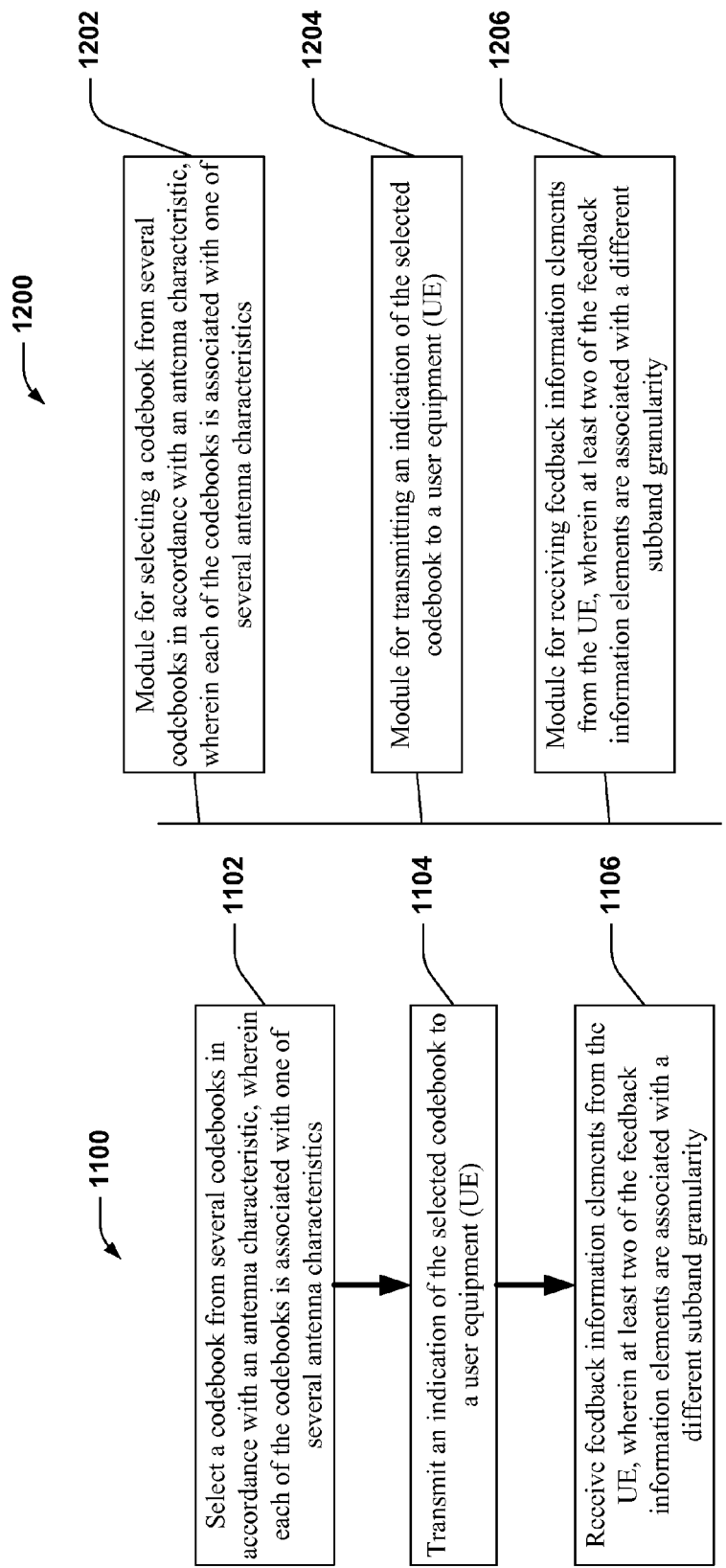
FIG. 11 is a flow chart representation of a process for wireless communication.
FIG. 12 is a block diagram representation of a portion of a wireless communication apparatus.

FIG. 11 is a flow chart representation of a wireless communication methodology 1100. At box 1102, a codebook is selected from several codebooks in accordance with an antenna characteristic, such as a transmit antenna configuration. Each of the codebooks may be associated with one of several antenna characteristics, such as the transmit antenna configurations illustrated in FIGS. 4A-F.

At box 1104, an indication of the selected codebook is transmitted to a UE 120. In one example, the indication of the selected codebook may include less information than the codebook itself. At box 1106, feedback information elements are received from the UE 120. At least two of the feedback information elements may be associated with a different subband granularity, as discussed above. Alternatively, or in addition, at least one of the feedback information elements may indicate a selection of a subset of precoder column vectors. Alternatively, or in addition, at least one of the feedback information elements may indicate a phase offset between two groups of transmit antennas. In this example, the first group of transmit antennas may be [0, 1, . . . , m], and the second group of transmit antennas may be [m+1, m+2, . . . Ntx−1], wherein Ntx is the total number of the transmit antennas, and m corresponds to the at least one feedback information elements.

FIG. 12 is a block diagram representation of a portion of a wireless communication apparatus 1200. Module 1202 is provided for selecting a codebook from several codebooks in accordance with an antenna characteristic, such as a transmit antenna configuration. Each of the codebooks may be associated with one of several antenna characteristics, such as the transmit antenna configurations illustrated in FIGS. 4A-F. Module 1204 is provided for transmitting an indication of the selected codebook to a UE 120. In one example, the indication of the selected codebook may include less information than the codebook itself. Module 1206 is provided for receiving feedback information elements from the UE 120. At least two of the feedback information elements may be associated with a different subband granularity, as discussed above. Alternatively, or in addition, at least one of the feedback information elements may indicate a selection of a subset of precoder column vectors. Alternatively, or in addition, at least one of the feedback information elements may indicate a phase offset between two groups of transmit antennas. In this example, the first group of transmit antennas may be [0, 1, ..., m], and the second group of transmit antennas may be [m+1, m+2, ... Ntx−1], wherein Ntx is the total number of the transmit antennas, and m corresponds to the at least one feedback information elements.

FIG. 13 is a flow chart representation of a wireless communication methodology 1300. At box 1302, an indication of one of several codebooks is received from a base station. Each of the codebooks may be associated with one of several antenna characteristics, such as the transmit antenna configurations illustrated in FIGS. 4A-F. In one example, the indication of the selected codebook may include less information than the codebook itself. For example, each of the several codebooks may be stored in a memory and the received indication of one of the codebooks may be used to retrieve the indicated codebook from the memory.

At box 1304, feedback information elements may be determined using the indicated codebook. At least two of the feedback information elements may be associated with a different subband granularity, as discussed above. Alternatively, or in addition, at least one of the feedback information elements may indicate a selection of a subset of precoder column vectors. Alternatively, or in addition, at least one of the feedback information elements may indicate a phase offset between two groups of transmit antennas. In this example, the first group of transmit antennas may be [0, 1, ..., m], and the second group of transmit antennas may be [m+1, m+2, ... Ntx−1], wherein Ntx is the total number of the transmit antennas, and m corresponds to the at least one feedback information elements. At box 1306, the feedback information elements may be transmitted to the base station 110.

FIG. 14 is a block diagram representation of a portion of a wireless communication apparatus 1400. Module 1402 is provided for receiving an indication of one of several codebooks from a base station. Each of the codebooks may be associated with one of several antenna characteristics, such as the transmit antenna configurations illustrated in FIGS. 4A-F. In one example, the indication of the selected codebook may include less information than the codebook itself. For example, each of the several codebooks may be stored in a memory and the received indication of one of the codebooks may be used to retrieve the indicated codebook from the memory. The channel state information feedback may include several feedback information elements. Module 1404 is provided for determining feedback information elements using the indicated codebook. At least two of the feedback information elements may be associated with a different subband granularity. Module 1406 is provided for transmitting the feedback information elements to the base station 110.

FIG. 15 is a flow chart representation of a wireless communication methodology 1500. At box 1502, a codebook is selected from several codebooks in accordance with an antenna characteristic, such as a transmit antenna configuration. Each of the codebooks may be associated with one of several antenna characteristics, such as the transmit antenna configurations illustrated in FIGS. 4A-F.

At box 1504, an indication of the selected codebook is transmitted to a UE 120. In one example, the indication of the selected codebook may include less information than the codebook itself. At box 1506, feedback information elements are received from the UE 120. At least one of the feedback information elements may indicate a selection of a subset of precoder column vectors. The base station may use the indicated subset of precoder column vectors to determine one or more precoders for precoding a signal. Alternatively, or in addition, at least two of the feedback information elements may be associated with a different subband granularity, as discussed above. Alternatively, or in addition, at least one of the feedback information elements may indicate a phase offset between two groups of transmit antennas. In this example, the first group of transmit antennas may be [0, 1, ..., m], and the second group of transmit antennas may be [m+1, m+2, .... Ntx−1], wherein Ntx is the total number of the transmit antennas, and m corresponds to the at least one feedback information elements.

FIG. 16 is a block diagram representation of a portion of a wireless communication apparatus 1600. Module 1602 is provided for selecting a codebook from several codebooks in accordance with an antenna characteristic, such as a transmit antenna configuration. Each of the codebooks may be associated with one of several antenna characteristics, such as the transmit antenna configurations illustrated in FIGS. 4A-F. Module 1604 is provided for transmitting an indication of the selected codebook to a UE 120. In one example, the indication of the selected codebook may include less information than the codebook itself. Module 1606 is provided for receiving feedback information elements from the UE 120. At least one of the feedback information elements may indicate a selection of a subset of precoder column vectors, such as a column permutation set. Alternatively, or in addition, at least two of the feedback information elements may be associated with a different subband granularity, as discussed above. Alternatively, or in addition, at least one of the feedback information elements may indicate a phase offset between two groups of transmit antennas. In this example, the first group of transmit antennas may be [0, 1, ..., m], and the second group of transmit antennas may be [m+1, m+2, ... Ntx−1], wherein Ntx is the total number of the transmit antennas, and m corresponds to the at least one feedback information elements.

Figures 17, 18:
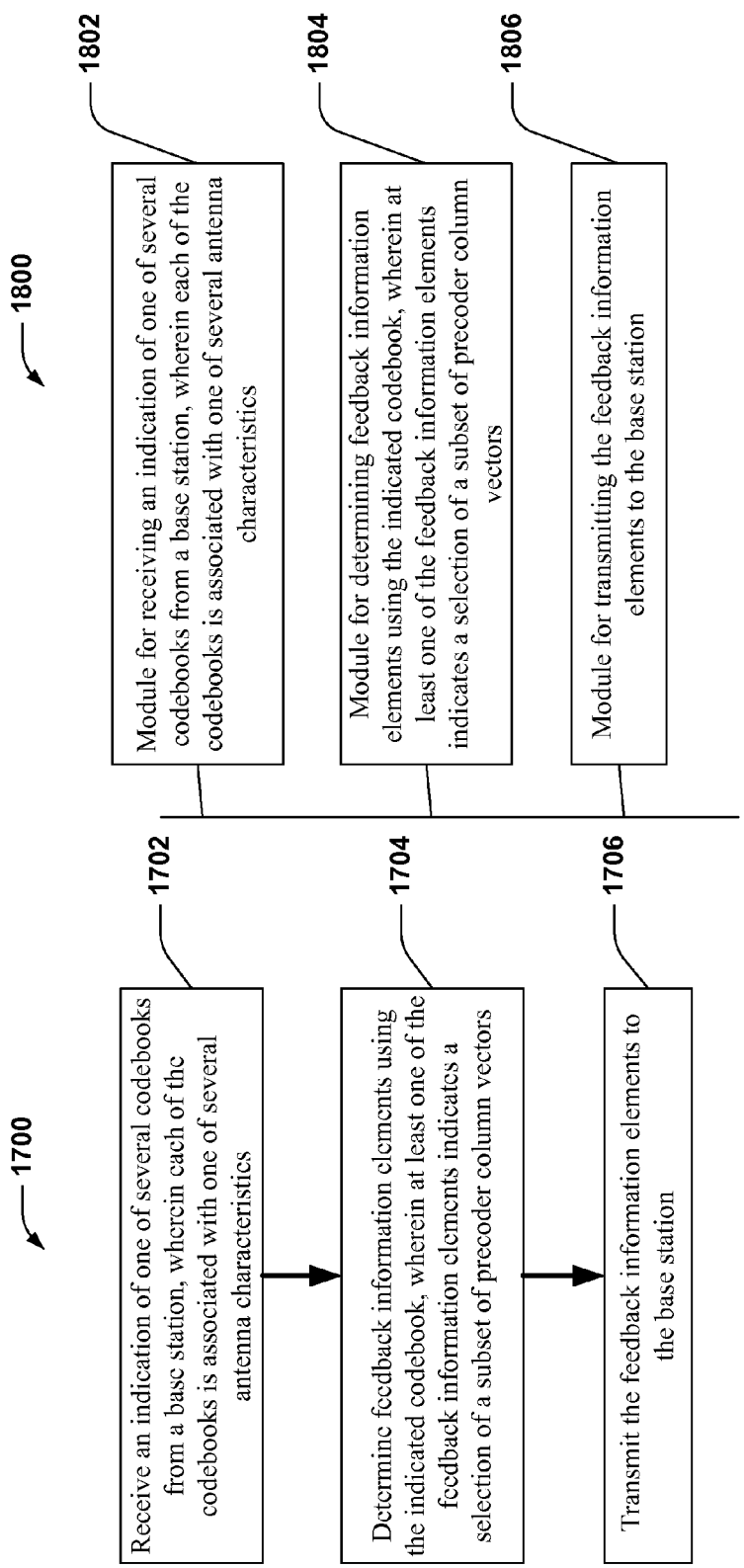
FIG. 17 is a flow chart representation of a process for wireless communication.
FIG. 18 is a block diagram representation of a portion of a wireless communication apparatus.

FIG. 17 is a flow chart representation of a wireless communication methodology 1700. At box 1702, an indication of one of several codebooks is received from a base station. Each of the codebooks may be associated with one of several antenna characteristics, such as the transmit antenna configurations illustrated in FIGS. 4A-F. In one example, the indication of the selected codebook may include less information than the codebook itself. For example, each of the several codebooks may be stored in a memory and the received indication of one of the codebooks may be used to retrieve the indicated codebook from the memory.

At box 1704, feedback information elements may be determined using the indicated codebook. At least one of the feedback information elements may indicate a selection of a subset of precoder column vectors. Alternatively, or in addition, at least two of the feedback information elements may be associated with a different subband granularity, as discussed above. Alternatively, or in addition, at least one of the feedback information elements may indicate a phase offset between two groups of transmit antennas. In this example, the first group of transmit antennas may be [0, 1, ..., m], and the second group of transmit antennas may be [m+1, m+2, ... Ntx−1], wherein Ntx is the total number of the transmit antennas, and m corresponds to the at least one feedback information elements. At box 1706, the feedback information elements may be transmitted to the base station 110.

FIG. 18 is a block diagram representation of a portion of a wireless communication apparatus 1800. Module 1802 is provided for receiving an indication of one of several codebooks from a base station. Each of the codebooks may be associated with one of several antenna characteristics, such as the transmit antenna configurations illustrated in FIGS. 4A-F. In one example, the indication of the selected codebook may include less information than the codebook itself. For example, each of the several codebooks may be stored in a memory and the received indication of one of the codebooks may be used to retrieve the indicated codebook from the memory. The channel state information feedback may include several feedback information elements. Module 1804 is provided for determining feedback information elements using the indicated codebook. At least one of the feedback information elements may indicate a selection of a subset of precoder column vectors. Module 1806 is provided for transmitting the feedback information elements to the base station 110.

Figure 19:
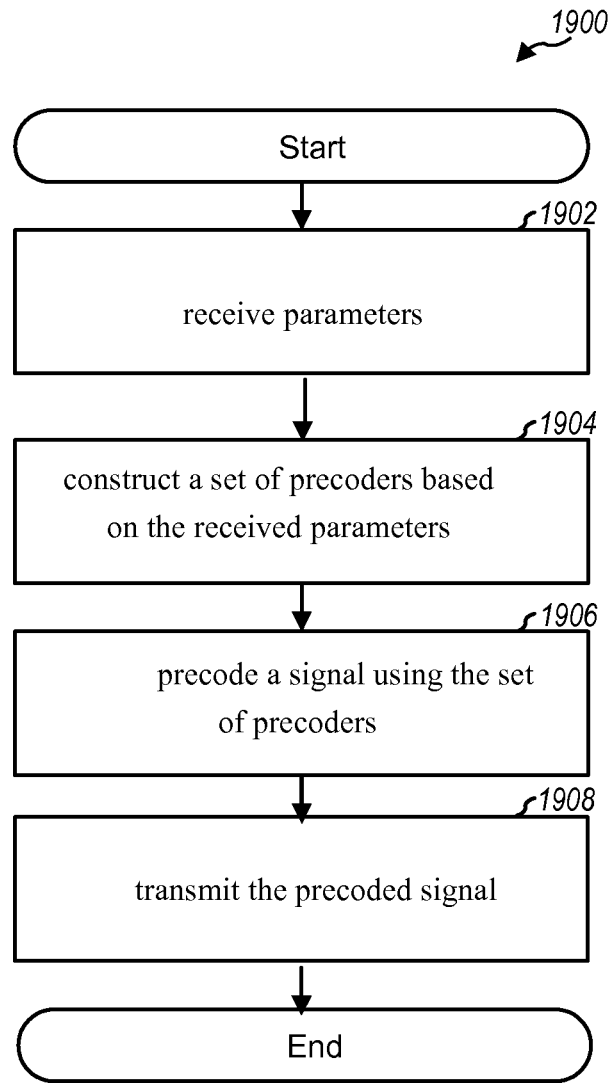
FIG. 19 is a flow chart representation of a process for wireless communication.

FIG. 19 is a flow chart representation 1900 of a method of wireless communication. At operation 1902, parameters are received, e.g., at a base station 110. At operation 1904, a set of precoders based on the received parameters is constructed. At step 1906, a signal is precoded using the set of precoders. At step 1908, the precoded signal is transmitted, e.g., from a base station 110 to a UE 120. At least one of the parameters is allocated a number of subband resource blocks based on a transmit antenna configuration, e.g., the assignments shown in Tables 2 and 3 for parameters $a_0$, $b_0$, $c_0$, $c_1$, $d_1$, $d_2$, and $d_3$.

Figure 20:
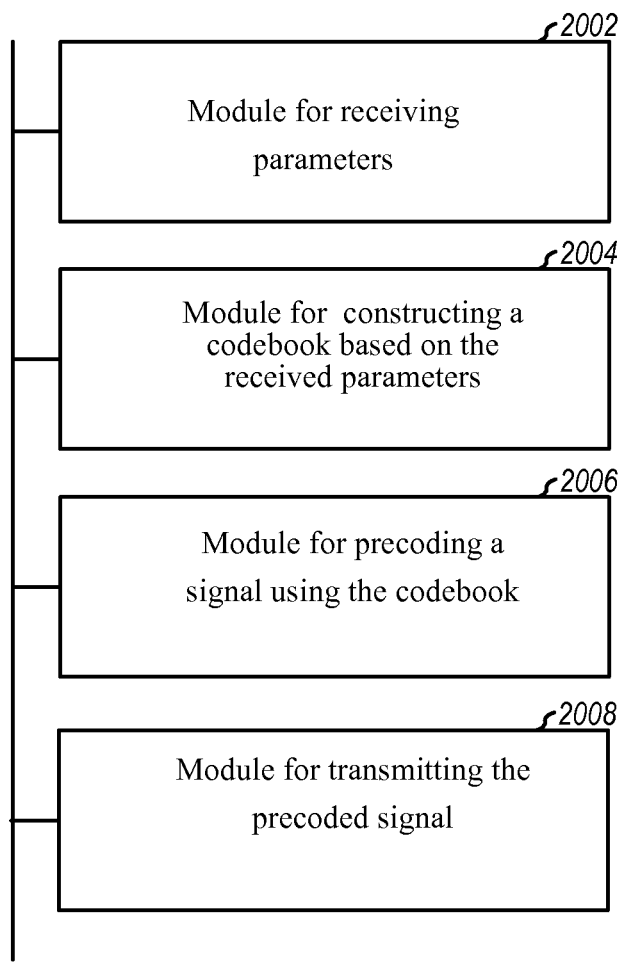
FIG. 20 is a block diagram representation of a portion of a wireless communication apparatus.

FIG. 20 is a diagrammatic representation of an apparatus for wireless communication. Module 2002 is provided for receiving parameters. Module 2004 is provided for constructing a codebook based on the received parameters. Module 2006 is provided for precoding a signal using the codebook. Module 2008 is provided for transmitting the precoded signal. At least one of the parameters is allocated a number of subband resource blocks based on a transmit antenna configuration.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

The various illustrative logical blocks, modules, and circuits described in connection with the embodiments disclosed herein (e.g., identifiers, assigners, transmitters and allocators), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

What is claimed is:

1. A method for wireless communication, comprising:
    selecting, at a base station, a codebook from a plurality of codebooks based at least in part on a configuration of a physical antenna, each of the plurality of codebooks being associated with one of a plurality of antenna configurations, the codebook being selected prior to receiving channel state information feedback from a user equipment (UE);
    transmitting, from the base station, an indication of the selected codebook to the UE; and
    receiving, at the base station, channel state information feedback from the UE, the channel state information feedback including a plurality of feedback information elements, and at least one of the plurality of feedback information elements indicating a phase offset between a plurality of transmit antenna groups, the channel state information feedback being used to at least determine downlink scheduling, determine downlink precoding, or a combination thereof.

2. The method of claim 1, wherein at least two of the plurality of feedback information elements are associated with a different subband granularity.

3. The method of claim 1, wherein a first group of the two groups of transmit antennas includes antennas 0, 1, ..., m, and a second group of the two groups of transmit antennas includes antennas m+1, m+2, ... Ntx−1, wherein Ntx is a total number of the transmit antennas, and m corresponds to the at least one of the plurality of feedback information elements.

4. The method of claim 1, wherein at least one of the plurality of feedback information elements indicates a selection of a subset of precoder column vectors.

5. An apparatus for wireless communication, comprising:
    means for selecting, at a base station, a codebook from a plurality of codebooks based at least in part on a configuration of a physical antenna, each of the plurality of codebooks being associated with one of a plurality of antenna configurations, the codebook being selected prior to receiving channel state information feedback from a user equipment (UE);
    means for transmitting, from the base station, an indication of the selected codebook to the UE; and
    means for receiving, at the base station, channel state information feedback from the UE, the channel state information feedback including a plurality of feedback information elements, and at least one of the plurality of feedback information elements indicating a phase offset between a plurality of transmit antenna groups, the channel state information feedback being used to at least determine downlink scheduling, determine downlink precoding, or a combination thereof.

6. The apparatus of claim 5, wherein at least two of the plurality of feedback information elements are associated with a different subband granularity.

7. The apparatus of claim 5, wherein a first group of the two groups of transmit antennas includes antennas 0, 1, ..., m, and a second group of the two groups of transmit antennas includes antennas m+1, m+2, ... Ntx−1, wherein Ntx is a total number of the transmit antennas, and m corresponds to the at least one of the plurality of feedback information elements.

8. The apparatus of claim 5, wherein at least one of the plurality of feedback information elements indicates a selection of a subset of precoder column vectors.

9. A base station for wireless communication, comprising:
    at least one processor configured:
        to select a codebook from a plurality of codebooks based at least in part on configuration of a physical antenna, each of the plurality of codebooks being associated with one of a plurality of antenna configurations, the codebook being selected prior to receiving channel state information feedback from a user equipment (UE);
        to transmit an indication of the selected codebook to the UE; and
        to receive channel state information feedback from the UE, the channel state information feedback including a plurality of feedback information elements, and at least one of the plurality of feedback information elements indicating a phase offset between a plurality of transmit antenna groups, the channel state information feedback being used to at least determine downlink scheduling, determine downlink precoding, or a combination thereof; and
    a memory coupled to the at least one processor.

10. A computer program product, comprising:
    a non-transitory computer-readable medium having program code recorded thereon, the program code comprising:
        program code to select, at a base station, a codebook from a plurality of codebooks based at least in part on a configuration of a physical antenna, each of the plurality of codebooks being associated with one of a plurality of antenna configurations, the codebook being selected prior to receiving channel state information feedback from a user equipment(UE);
        program code to transmit, from the base station, an indication of the selected codebook to the UE; and
        program code to receive, at the base station, channel state information feedback from the UE, the channel state information feedback including a plurality of feedback information elements, and at least one of the plurality of feedback information elements indicating a phase offset between a plurality of transmit antenna groups, the channel state information feedback being used to at least determine downlink scheduling, determine downlink precoding, or a combination thereof.

11. A method for wireless communication, comprising:
    receiving an indication of a codebook of a plurality of codebooks, the codebook being selected at a base station based at least in part on configuration of a physical antenna, each of the plurality of codebooks being associated with one of a plurality of antenna configurations, the codebook being selected prior to channel state information feedback being transmitted to the base station;
    determining channel state information feedback using the codebook of the plurality of codebooks; and
    transmitting the channel state information feedback, the channel state information feedback including a plurality of feedback information elements, and at least one of the plurality of feedback information elements indicating a phase offset between a plurality of transmit antenna groups, the channel state information feedback being used by the base station to at least determine downlink scheduling, determine downlink precoding, or a combination thereof.

12. The method of claim 11, wherein at least two of the plurality of feedback information elements are associated with a different subband granularity.

13. The method of claim 11, wherein a first group of the two groups of transmit antennas includes antennas 0, 1, ..., m, and a second group of the two groups of transmit antennas includes antennas m+1, m+2, ... Ntx−1, wherein Ntx is a total number of the transmit antennas, and m corresponds to the at least one of the plurality of feedback information elements.

14. The method of claim 11, wherein at least one of the plurality of feedback information elements indicates a selection of a subset of precoder column vectors.

15. An apparatus for wireless communication, comprising:
means for receiving an indication of a codebook of a plurality of codebooks, the codebook being selected at a base station based at least in part on configuration of a physical antenna, each of the plurality of codebooks being associated with one of a plurality of antenna configurations, the codebook being selected prior to channel state information feedback being transmitted to the base station;
means for determining channel state information feedback using the codebook of the plurality of codebooks; and
means for transmitting the channel state information feedback, the channel state information feedback including a plurality of feedback information elements, and at least one of the plurality of feedback information elements indicating a phase offset between a plurality of transmit antenna groups, the channel state information feedback being used by the base station to at least determine downlink scheduling, determine downlink precoding, or a combination thereof.

16. The apparatus of claim 15, wherein at least two of the plurality of feedback information elements are associated with a different subband granularity.

17. The apparatus of claim 15, wherein a first group of the two groups of transmit antennas includes antennas 0, 1, . . . , m, and a second group of the two groups of transmit antennas includes antennas m+1, m+2, . . . Ntx−1, wherein Ntx is a total number of the transmit antennas, and m corresponds to the at least one of the plurality of feedback information elements.

18. The apparatus of claim 15, wherein at least one of the plurality of feedback information elements indicates a selection of a subset of precoder column vectors.

19. An apparatus for wireless communication, comprising:
a memory unit; and
at least one processor coupled to the memory unit, the at least on processor configured:
to receive an indication of a codebook of a plurality of codebooks, the codebook being selected at a base station based at least in part on configuration of a physical antenna, each of the plurality of codebooks being associated with one of a plurality of antenna configurations, the codebook being selected prior to channel state information feedback being transmitted to the base station,
to determine channel state information feedback using the codebook of the plurality of codebooks, and
to transmit the channel state information feedback, the channel state information feedback including a plurality of feedback information elements, and at least one of the plurality of feedback information elements indicating a phase offset between a plurality of transmit antenna groups, the channel state information feedback being used by the base station to at least determine downlink scheduling, determine downlink precoding, or a combination thereof.

20. A computer program product, comprising:
a non-transitory computer-readable medium having program code recorded thereon, the program code comprising:
program code to receive an indication of a codebook of a plurality of codebooks, the codebook being selected at a base station based at least in part on configuration of a physical antenna, each of the plurality of codebooks being associated with one of a plurality of antenna configurations, the codebook being selected prior to channel state information feedback being transmitted to the base station;
program code to determine channel state information feedback using the codebook of the plurality of codebooks; and
program code to transmit the channel state information feedback, the channel state information feedback including a plurality of feedback information elements, and at least one of the plurality of feedback information elements indicating a phase offset between a plurality of transmit antenna groups, the channel state information feedback being used by the base station to at least determine downlink scheduling, determine downlink precoding, or a combination thereof.

* * * * *